US012647063B2

(12) United States Patent
    Richards

(10) Patent No.: US 12,647,063 B2
(45) Date of Patent: Jun. 2, 2026

(54) ROOFING SHINGLE FOR COLLECTING SOLAR ENERGY

(71) Applicant: Joseph Richards, Reno, NV (US)

(72) Inventor: Joseph Richards, Reno, NV (US)

( * ) Notice: Subject to any disclaimer, the term of this patent is extended or adjusted under 35 U.S.C. 154(b) by 577 days.

(21) Appl. No.: 18/157,576

(22) Filed: Jan. 20, 2023

(65) Prior Publication Data

US 2023/0238913 A1 Jul. 27, 2023

Related U.S. Application Data

(60) Provisional application No. 63/301,499, filed on Jan. 21, 2022.

(51) Int. Cl.
    | | |
    |---|---|
    | *H02S 20/25* | (2014.01) |
    | *E04D 1/00* | (2006.01) |
    | *E04D 1/26* | (2006.01) |
    | *E04D 1/28* | (2006.01) |
    | *E04D 1/30* | (2006.01) |
    | *H02S 40/36* | (2014.01) |

(52) U.S. Cl.
    CPC ............... *H02S 20/25* (2014.12); *E04D 1/26* (2013.01); *E04D 1/28* (2013.01); *E04D 1/2916* (2019.08); *E04D 1/2963* (2019.08); *E04D 1/30* (2013.01); *H02S 40/36* (2014.12); *E04D 2001/308* (2013.01); *E04D 2001/309* (2013.01)

(58) Field of Classification Search
    CPC .................................. H02S 20/25; H02S 40/36
    See application file for complete search history.

(56) References Cited

U.S. PATENT DOCUMENTS

| | | |
|---|---|---|
| 2012/0151856 A1 | 6/2012 | Azoulay |
| 2013/0067852 A1 | 3/2013 | Kalkanolgu et al. |
| 2013/0118558 A1* | 5/2013 | Sherman ............... H10F 19/906 |
| | | 136/251 |
| 2014/0208670 A1* | 7/2014 | Koch ........................ E04D 1/26 |
| | | 52/173.3 |
| 2015/0000727 A1* | 1/2015 | Sherman ................ H10F 19/80 |
| | | 29/877 |

(Continued)

OTHER PUBLICATIONS

International Search Report; International Searching Authority; International Application No. PCT/US2023/060999; Jun. 26, 2023; 2 pages.

(Continued)

*Primary Examiner* — Babajide A Demuren
(74) *Attorney, Agent, or Firm* — Vivacqua Crane, PLLC

(57) ABSTRACT

A solar shingle having a substrate positioned beneath an upper material layer and at least one photovoltaic cell coupled to the substrate. A first terminal can be electrically coupled to the at least one photovoltaic cell and positioned adjacent to a first sidewall of the solar shingle, and a second terminal can be electrically coupled to the at least one photovoltaic cell and positioned adjacent to a second sidewall of the solar shingle. An upper surface of the upper material layer can have one or more recesses positioned between the first sidewall and the second sidewall and adjacent to the at least one photovoltaic cell. Further, the upper surface can have a variety of imparted surface characteristics, among other aesthetics and coloring, that can provide the solar shingle with outwardly appearance that is at least similar to traditional, non-solar shingles.

10 Claims, 21 Drawing Sheets

(56)        References Cited

U.S. PATENT DOCUMENTS

| 2018/0123504 | A1  | 5/2018 | Almy et al. | |
| 2019/0089294 | A1* | 3/2019 | Corneille | H02S 30/10 |
| 2023/0163226 | A1* | 5/2023 | Perkins | H10F 71/00 |
| | | | | 136/246 |

OTHER PUBLICATIONS

Written Opinion of the International Searching Authority; International Searching Authority; International Application No. PCT/US2023/060999; Jun. 26, 2023; 5 pages.

* cited by examiner

ROOFING SHINGLE FOR COLLECTING SOLAR ENERGY

CROSS REFERENCE TO RELATED APPLICATIONS

The present application claims the benefit of U.S. Provisional Patent Application Ser. No. 63/301,499, filed Jan. 21, 2022, which is incorporated herein by reference in its entirety.

BACKGROUND

Embodiments of the present disclosure generally relate to building-integrated photovoltaics (BIPV), and more particularly, but not exclusively, to roofing shingles having a physical appearance and ease of installation that is similar to traditional shingles while also being adapted to convert solar energy into electrical power.

Solar roofing, whether installed with new or existing residential or commercial buildings, can be adapted to convert solar energy into electricity. Yet, traditional solar roofing can, when compared to at least traditional shingle roofs, be relatively complex, and thus costly and time consuming to install. Additionally such solar roofing typically does not have the appearance of a traditional roof. Thus, with respect to at least some consumers' preferences, such solar roofing can be unsightly, and not conform to the appearance of other neighboring buildings.

Additionally, at least some current solar roofing systems utilize custom panels. Yet, rather than allowing for a continuous flow of install, such custom panels are typically made, organized and installed in a specific manner, which adds to the complexity of the design and installation. This is particularly evident with respect to installation of such custom panels at transitional parts of a roof, including, for example, a pipe boot, edge, or skylight.

Accordingly, such solar roofs can, for example, take about a full month to design and package, and an additional three weeks to install. Moreover, in at least some instances, a solar roof manufacturer may send a team to the subject building to obtain data of the roof, including obtaining data via pictures and/or video of the roof at numerous angle via use of drones. The attained data can then be inputted into a program, as well as utilized by design engineers, to customize the solar roof package. Such information gathering and design processes can take, for example, a couple of weeks before plans for the custom solar panels are ready to be used in manufacturing. Further, after being manufactured and shipped to a worksite, installation of such relatively complex solar roofing systems can take a couple weeks to complete. All of these activities and time can contribute to such solar roofs being relatively expensive for the consumer, provide low margin profit for the manufacturers, and can create a carbon footprint that may nearly negate any carbon-offset such use of renewable solar energy is intended to provide.

Thus, a need exists to address the technical, logistical, and economic challenges traditionally encountered with solar roofing.

BRIEF SUMMARY

An aspect of the present disclosure is a solar shingle comprising a substrate positioned beneath an upper material layer and at least one photovoltaic cell coupled to the substrate and positioned beneath the upper material layer. A first terminal can be electrically coupled to the at least one photovoltaic cell and positioned adjacent to a first sidewall of the solar shingle. Additionally, a second terminal can be electrically coupled to the at least one photovoltaic cell and positioned adjacent to a second sidewall of the solar shingle. Further, an upper surface of the upper material layer can have one or more recesses positioned between the first sidewall and the second sidewall and adjacent to the at least one photovoltaic cell.

Another aspect of the present disclosure is a solar shingle comprising a substrate positioned beneath an upper material layer of the solar shingle, and a first photovoltaic string having at least one photovoltaic cell. Additionally, the solar shingle can include a first connector having a first terminal and a second terminal, the first terminal of the first connector being electrically coupled to the first photovoltaic string, the second terminal of the first connector being electrically coupled to a second line. The solar shingle can further include a second connector having a first terminal and a second terminal, the first terminal of the second connector being electrically coupled to the second line, the second terminal of the second connector being electrically coupled to the first photovoltaic string. Additionally, the solar shingle can include a nail strip that can extend about at least a portion of the upper material layer, the nail strip not extending over both the first photovoltaic string and the second line.

BRIEF DESCRIPTION OF THE DRAWINGS

The descriptions herein make reference to the accompanying figures wherein like reference numerals refer to like parts throughout the several views.

Figure 1:
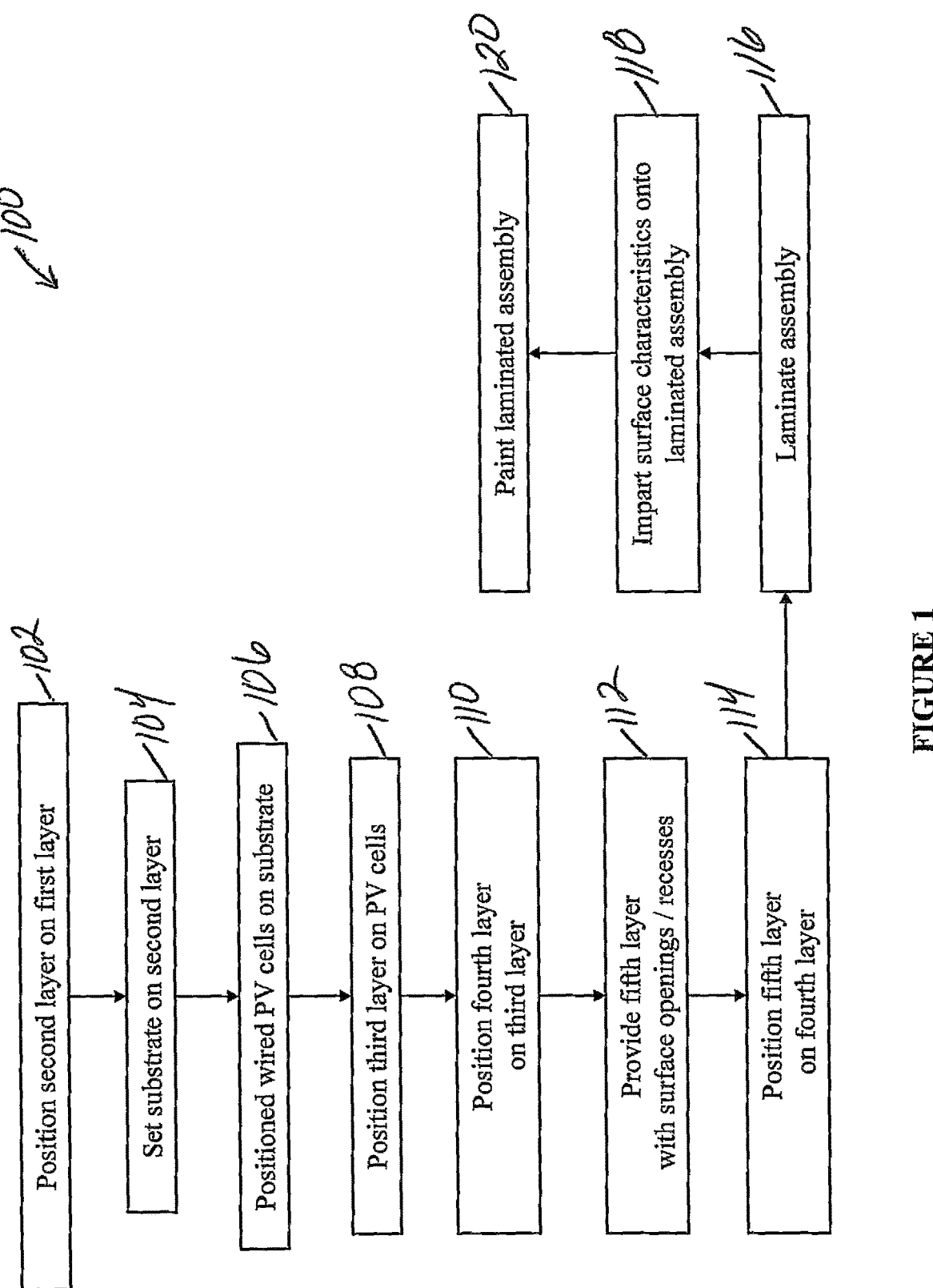
FIG. 1 illustrates a simplified flow chart of an exemplary method for constructing a solar shingle according to an embodiment of the subject application.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Embodiments discussed herein relate to solar shingles, and associated systems, that can be utilized in producing electrical power from solar energy. Further, the solar shingles discussed herein can each individually operate as a single solar panel, or, in combination with other solar shingles to provide a larger solar panel. Thus, individual or groups of solar shingles can provide a plurality of solar panels for a building or structure. Additionally, as discussed below, the solar shingles discussed herein can have an appearance similar to traditional styles of non-solar roofing shingles. Such solar shingles can thereby allow installers the ability to customize a path(s) for the flow or electrical power, as well as localize power collection areas, to certain zones, if not the entirety, of a roof or other structure. For example, embodiments of the subject application can allow solar, or active, shingles to be utilized on one or more sides, areas, or portions of a roof, such as, for example, one or more areas of a roof that is/are anticipated to be suited for generation of power from solar energy. Further, by providing an appearance similar to traditional shingles, other portions, areas, or sides of the roof not anticipated to not be suited for generation of power from solar energy can utilize traditional, non-solar or inactive shingles while minimizing visually distinguishable differences between at least the outwardly appearance or aesthetics of the solar, or active shingles and the non-solar, or inactive shingles.

Figure 2A:
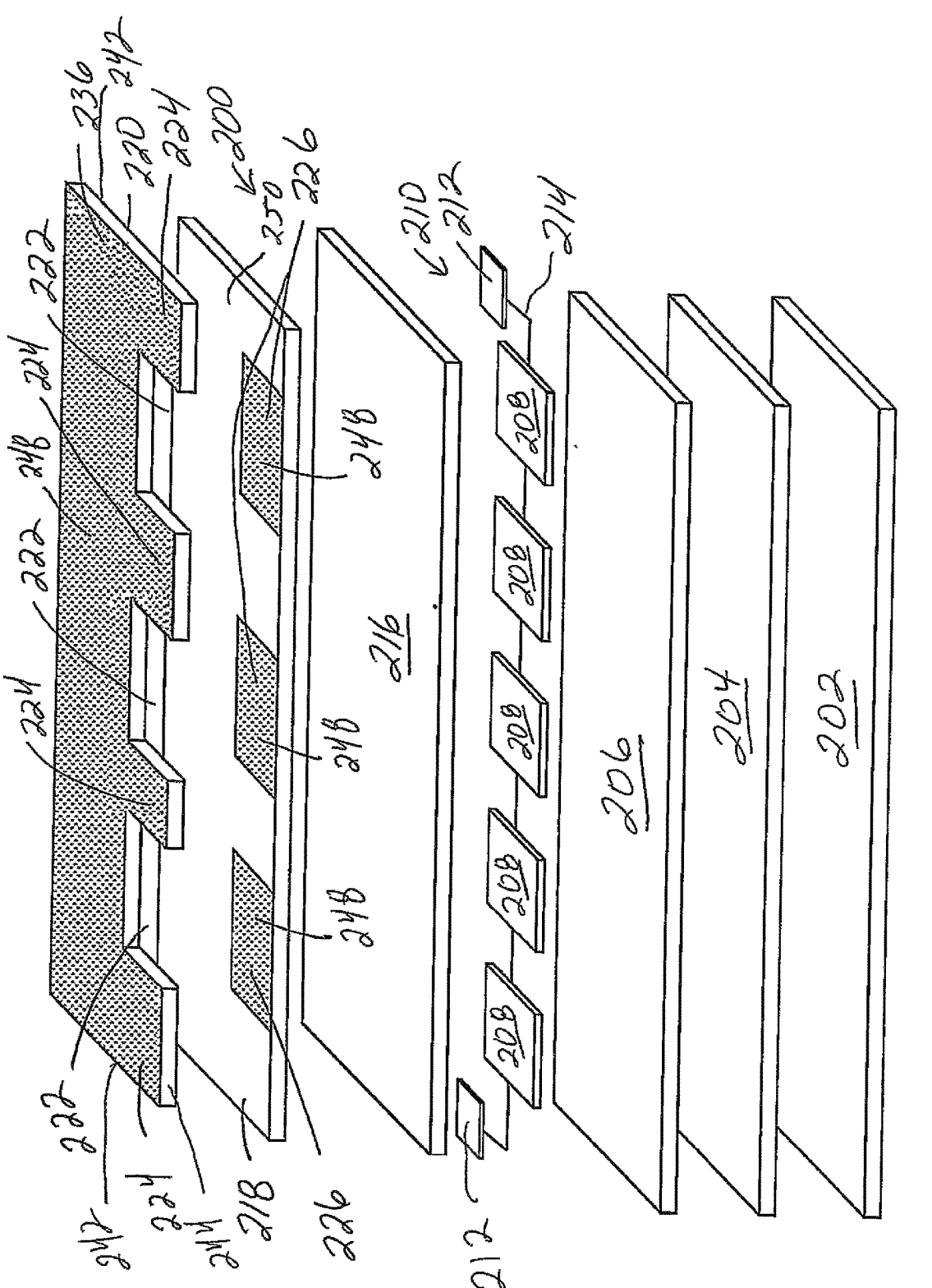
FIGS. 2A, 2B, 2C, and 3 illustrate exploded and side views, respectively, of exemplary solar shingles according to embodiments of the subject application.
Figure 2B:
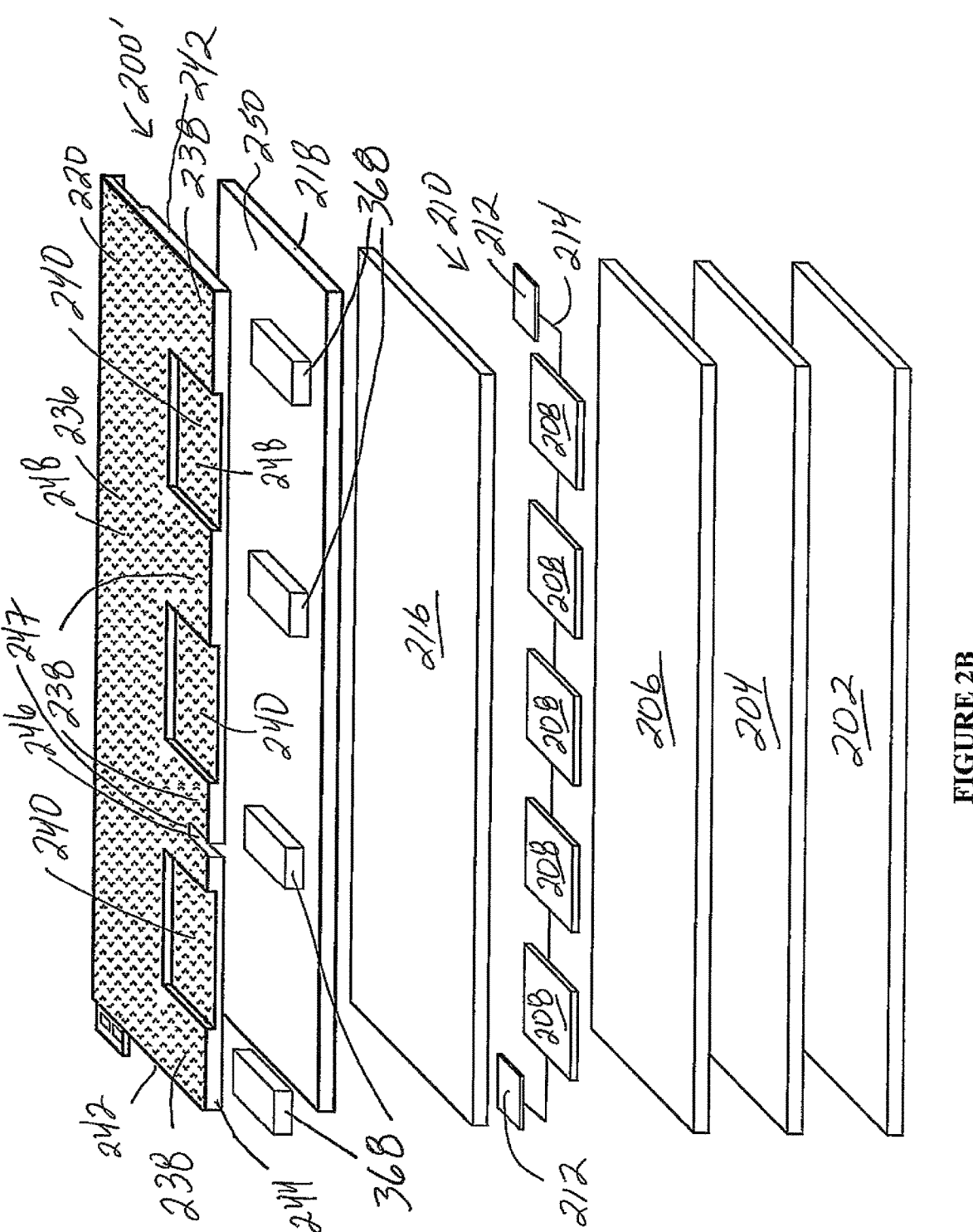

FIG. 1 illustrates a simplified flow chart of an exemplary method 100 for constructing a solar shingle according to an embodiment of the subject application. For at least purposes of illustration, the illustrated method 100 corresponds to, or is otherwise associated with, performance of the blocks described below in the illustrative sequence of FIG. 1. It should be appreciated that the method 100 discussed below can be performed in one or more sequences different from the illustrative sequence. Further, FIGS. 2A, 2B and 3 illustrate exemplary solar shingles 200, 200' that can, for example, be constructed at least via the method 100 shown in FIG. 1, among other methods of, or procedures for, construction.

Figure 2C:
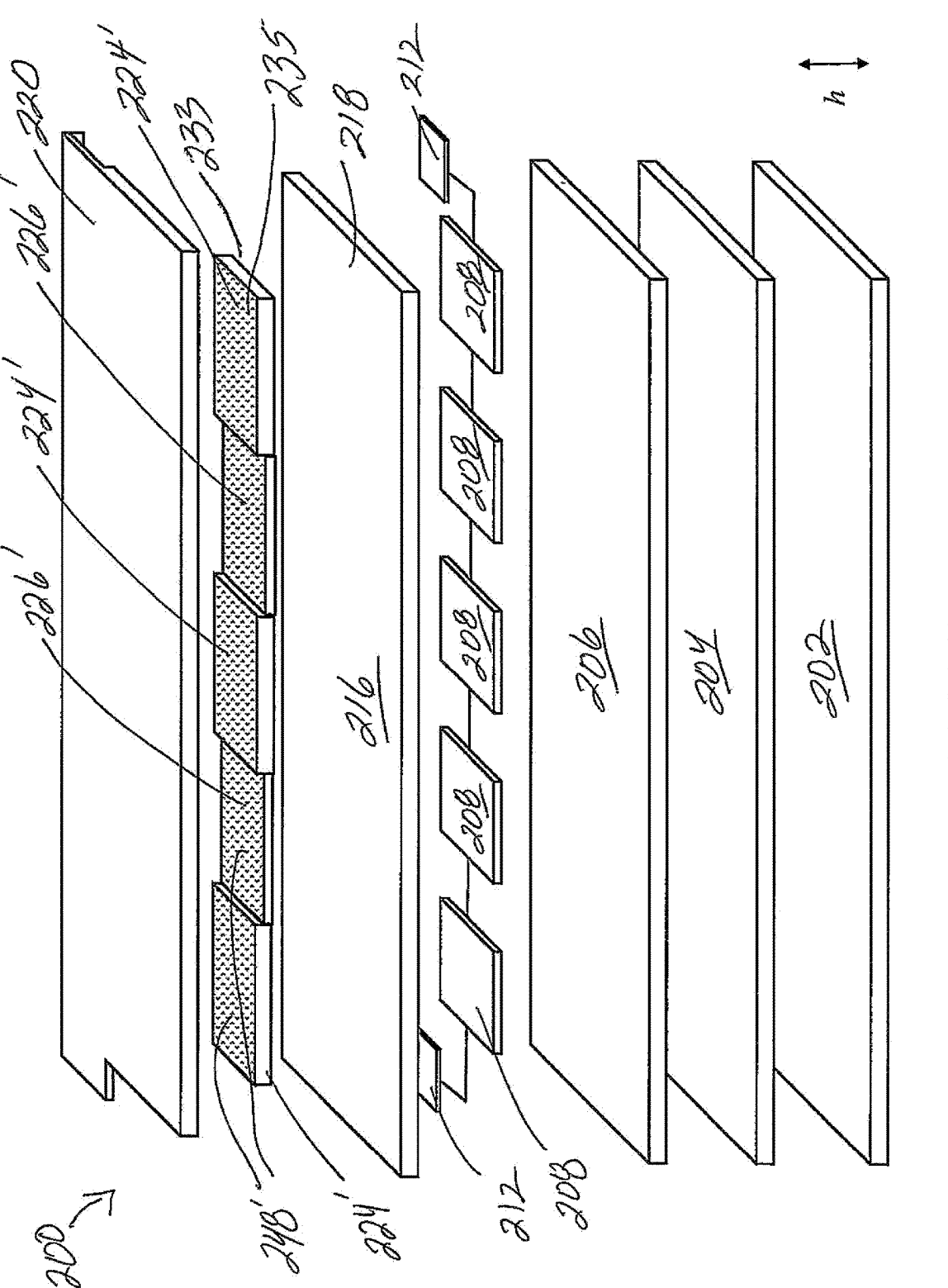
Figures 3, 4:
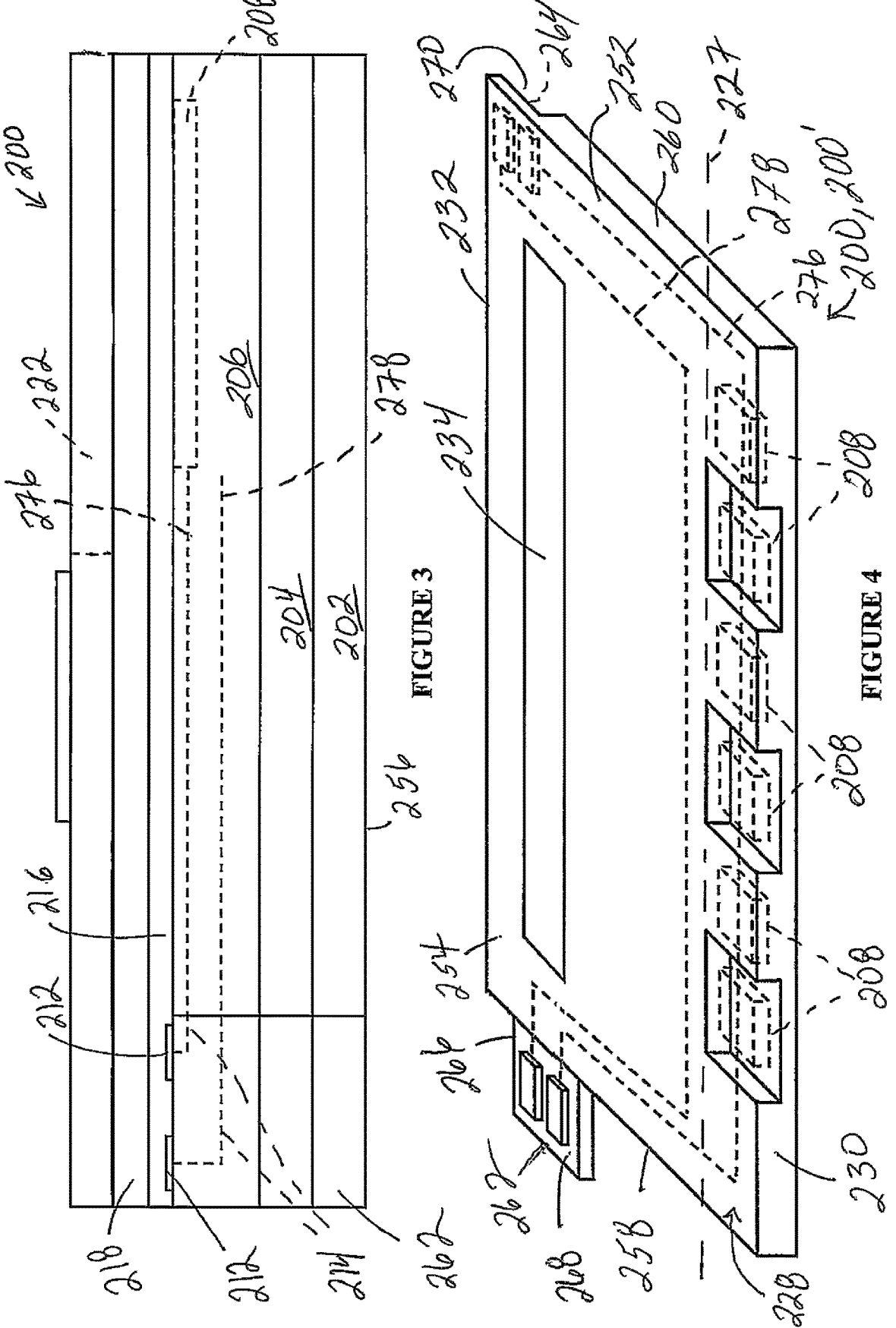
FIG. 4 illustrates an upper side perspective view of an exemplary solar shingle according to an embodiment of the subject application.

Referencing FIGS. 1-3, at block 102, a first, or bottom, layer 202 of material, such as, for example, ethylene vinyl acetate (EVA), receives placement of a second layer 204 of a different material, such as, for example, ethylene tetrafluoroethylene (ETFE). Moreover, the second layer 204 can be laid onto an upper surface of the first layer 202. Each of the first and second layers 202, 204 of material, in this example, EVA and ETFE, respectively, can be relatively thin, and can comprise, for example, a film. According to certain embodiments, the first layer 202 can have a thickness of around 0.3 millimeter (mm) to around 0.5 mm, while the second layer 204 can have a thickness of around 0.1 mm to around 0.3 mm.

At block 104, a substrate or backing board 206, such as, for example, a piece of fiberglass board or rubber, can be positioned on top of the second layer 204 of material (e.g., on top of a layer of ETFE). The substrate 206 can have a thickness and/or stiffness that can assist in providing structural stability to the solar shingle 200, 200'. According to certain embodiments, the substrate 206 is configured to provide strength to the solar shingle 200, 200' against fracture. For example, according to certain embodiments, the substrate 206 is configured to have a strength that can resist fracturing of the substrate 206, and thus the solar shingle 200, 200', that may otherwise be associated with an impact force against the solar shingle 200, 200', including, but not limited to, impact forces associated with the solar shingle 200, 200' being hit by hail and/or a hammer during installation, or bending caused by lift/draft of wind. Additionally, the substrate 206 can also have a strength that can resist fracturing of the substrate 206, and thus the solar shingle 200, 200', when the shingle 200, 200' is subjected to load bearing forces, including, but not limited to, the weight of an installer standing and/or kneeling on the shingle 200, 200' at least during installation of the shingle 200, 200' or other generally adjacent shingles. According to certain embodiments, the substrate 206 can have a thickness of around 0.5 mm to around 1 mm.

At block 106, one or more solar or photovoltaic (PV) cells 208 can be positioned on, embedded in, and/or adhered to the substrate 206. According to certain embodiments, each solar shingle 200, 200' may have at least two PV cells 208. Prior, or subsequent, to placement of the PV cells 208 on the substrate 206, the PV cells 208 can be electrically coupled to one or more of other PV cells 208, if any, to form one or more PV cell strings 210, and/or electrically coupled to any other associated electrical terminals, pads, or contacts 212 of the solar shingle 200, 200'. According to certain embodiments, the PV cells 208, such as, for example, silicon PV cells, can have a thickness of about 0.14 mm to about 0.24 mm, while other PV cells, such as perovskite PV cells, can have a thickness of around 300 nanometers (nm) to about 900 nm, and quantum dot PV cells can have a thickness of about 100 nm to about 400 nm. Further, to the extent the PV cells 208 are adhered to the substrate 206, steps may be taken to prevent delamination that may be associated with temperature differences between at least the PV cells 208 and the substrate 206. Further, according to certain embodiments, the PV cells 208 can be deposited onto the substrate 206 via spray coating or slot-die coating.

Block 106 can also involve securing electronic components to the substrate 206 in addition to the PV cells 208, including, for example, wires 214, terminals 212, jumpers, metallic foil, and bypass diodes, among other components. According to certain embodiments, the substrate is a rubber, tar, or tar-like material in which such components can be embedded. According to certain embodiments, the wires 214 or other conductive electronic components can be applied to the substrate 206 via metallic grid by printing. For example, according to certain embodiments, the PV cell(s) 208 and associated electrical terminals 212 can be electrically coupled via one or more electrically conductive wires, including, but not limited to, relatively flat wires, via a process that may be referred to as tabbing, stringing, or bussing. The terminals 212 can be constructed from a variety of electrically conductive materials, including, but not limited to, metallic materials.

At block 108, a third, mid-layer 216 of material that may be the same as the material of the second layer 204 (e.g. ETFE) can be positioned over the PV cells 208, as well as over the associated electrical wires, among other electrical components and/or the substrate 206. Similar to the first and second layers 202, 204, the third layer 216 can comprising a relatively thin sheet or film of material. For example, according to certain embodiments, the third layer 216 can have a thickness of around 0.1 mm to around 0.3 mm.

Further, at block 110, a fourth, mid-layer 218 of material can be positioned on top of the relatively thin third layer 216. According to certain embodiments the fourth layer 218 can comprise a material that is similar to the first layer 202 (e.g., EVA). The fourth layer 218 can be relatively thick, including, for example, be thicker than each of the previously discussed first, second, and third layers 202, 204, 216 of material, including, for example, having a thickness of about 1.5 mm. Such a thickness of the fourth layer 218 can, according to certain embodiments, be provided by a single film of material, or by a plurality of layers of film, including, for example, three layers that each have a thickness of about 0.5 mm.

At block 112, a fifth, upper layer 220 of EVA can be formed, or otherwise machined and/or milled, to adjust a profile of the fifth layer 220. More specifically, according to certain embodiments, the profile of the fifth layer 220 can be adjusted by molding, cutting, punching, or otherwise removing material to provide, one or more recesses in the form of cutouts 222 into the fifth layer 220. For example, as shown in FIG. 2A, the fifth layer 220 can be cut so as to have one or more cutouts 222, which can provide at least an aesthetic or appearance to the solar shingle 200, 200' similar to an architectural style shingle. According to such embodiments, the cutouts 222 can extend through the fifth layer 220 to expose a portion of the fourth layer 218 that is positioned there beneath, thereby providing a three-dimensional (3D) feature to the solar shingle 200. Thus, in the lower region of the solar shingle 200 can alternate between a first portion 224, which comprises the fifth layer 220, a second portion 226 comprising the fourth layer 218 that is positioned beneath the cutout 222 of the fifth layer 220. The fifth layer 220 can have a thickness that may be similar to that of the fourth layer 218, such as, for example, 1.5 mm, which may comprise a single layer or sheet of film or a plurality of layers of such sheet or film.

Figures 13, 14:
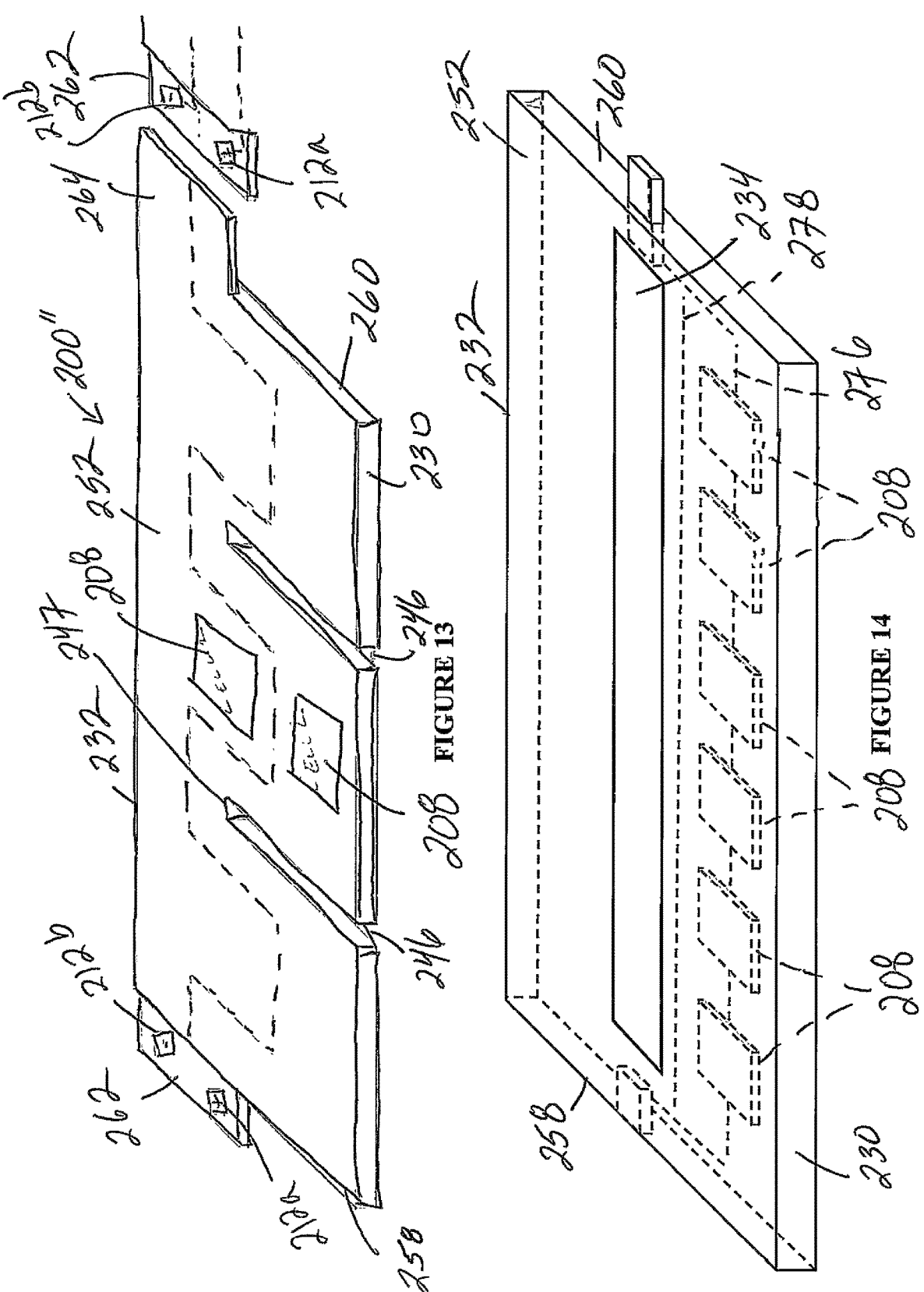
FIG. 13 illustrates an upper side perspective view of an embodiment of a solar shingle.
FIG. 14 illustrates an upper side perspective view of an embodiment of a solar shingle having a first string of PV cells.

Referencing FIGS. 2A, 2B, and 4, according to certain embodiments, each of the first and second portions 224, 226 can, together, generally define an upper side boundary 227 of a PV cell zone 228 in a direction between the upper sidewall 232 and the bottom sidewall 230 of the solar shingle 200, 200', below which the PV cells 208 are to be placed and/or confined. Thus, according to certain embodiments, the PV cell zone 228 is positioned between the upper side boundary 227 and the bottom sidewall 230, which can also be referred to as bottom side boundary of the PV cell zone 228 and can vertically extend between the upper surface 252 and at least a portion of the substrate 206. Alternatively, according to other embodiments, the upper side boundary 227 of the PV cell zone 228 can be generally defined by an upper wall 247 of a recess at least in the fifth, upper layer 220 in the form of a slot 246. The first and second portions 224, 226, and thus the PV cell zone 228, can have a vertical height from a bottom sidewall 230 of the solar shingle 200, 200' and generally toward the upper sidewall 232 of the shingle 200 that prevents the PV cell zone 228 from being at a location at which the PV cells 208 could, in a typical installation, be covered by another solar shingle(s) 200 in the next, vertically higher row of shingles 200. Further, the PV cell zone 228 can extend from between the bottom sidewall 230 of the solar shingle 200, 200' and a nail strip 234 that may extend across a mid-section of the solar shingle 200, 200', as indicated by FIG. 14, or an upper section of the solar shingle 200, as seen in FIG. 4. Additionally, according to certain embodiments, one or both of the first and second portions 224, 226 can be sized to provide an area for placement of at least one, and possibly two, PV cells 208. Additionally according to certain embodiments, electrical connectors and/or wires 214 that extend between the PV cells 208, and/or which carry current from other solar shingles 200, 200', including, for example, the first string 276 and second line 278, may be generally be routed to the PV cell zone 228, as well as extend around nail strips 234 so as to prevent inadvertent damage to the wires 214 and other electrical components.

Referencing FIG. 2B, alternatively, or additionally, the fifth layer 220 can be configured such that different portions of an upper surface 236 of the fifth layer 220 are vertically offset from, or recessed relative to, other adjacent portions of the upper surface 236. For example, according to certain embodiments, one more first portions 238 of the upper surface 236 of the fifth layer 220 can extend to a vertical height that is higher than adjacent or neighboring second portions 240 of the upper surface 236. Thus, the first portions 238 can be on a vertical plane that is higher than a vertical plane of the second portion 240, thereby assisting in the three-dimensional appearance of the solar shingle 200'. As seen in FIG. 2B, similar to the first and second portions 224, 226 shown in FIG. 2A, according to certain embodiments, the first and second portions 238, 240 alternate along the upper surface 236 between the opposing side edges 242 and from the lower edge 244 of the fifth layer 220, and can be positioned in the PV cell zone 228. Further, as seen in FIGS. 2A and 2B, according to certain embodiments, the first and second portions 224, 226, 238, 240 may or may not have shapes and/or sizes that generally conform at least to the shape and size of the PV cell(s) 208 that will be positioned within and/or around the corresponding first or second portions 224, 226, 238, 240.

As also seen in FIG. 2B, in addition to, or in lieu of cutouts 222 or vertically offset areas, as shown in FIGS. 2A and 2B, one or more slots 246 can extend through at least the fifth layer 220. Alternatively, as seen in FIG. 13, according to certain embodiments, such a slot(s) 234 can extend through a least a portion of each layer 202, 204, 216, 218, 220 and the substrate 206 of the solar shingle 200". Thus, as shown in FIG. 13, the appearance of the solar shingle 200" can, for example, be similar to a traditional three tab shingle, while also including PV related features, as discussed herein. Further, according to the illustrated embodiment, the slot 246 can have a generally elongated shape and extend from the bottom sidewall 230 in a direction toward, but not reaching, the upper sidewall 232, and can generally be parallel to the first and second sidewalls 258, 260 of the shingle 200', 200". Further, while FIG. 2B illustrates a single slot 246, as indicated by at least FIG. 13, other embodiments can include a plurality of slots 246, while other embodiments may not include any slots 246.

At block 114, the contoured or shaped fifth layer 220 can be positioned on the fourth layer 218, thereby providing an assembly for the solar shingle 200, 200' that includes each layer 202, 204, 216, 218, 220, the substrate 206, the PV cell(s) 208, and the associated wiring 214 and terminals 212, among other components. At block 116, the assembly can be laminated together. While lamination can be attained in a variety of manners, and at a variety of temperatures, according to the illustrated embodiment, the shingle assembly can be laminated by heating the shingle assembly, for example, in an oven, to temperatures of around 340 degrees Fahrenheit (° F.) to around 400° F., among other temperatures. The lamination process can seal at least some of the layers 202, 204, 216, 218, to each other in a manner that can seal inner portions of the resulting shingle 200, 200' from external elements, including, for example, from the ingress of moisture and debris. Further, according to certain embodiments, the layers 202, 204, 216, 218, 220 can be sized and/or configured such that layers 202, 204, 216, 218, 220 are laminated to another layer(s) 202, 204, 216, 218, 220 that comprise similar material. For example, according to certain embodiments, the second and third layers 204, 216 can, for example, comprise EFTE, among other materials, while the first, fourth, and fifth layers 202, 218, 220 can comprise EVA, among other materials. According to such an embodiment, the lamination process can result in the second layer 204 being laminated to the third layer 216, and the first, fourth, and fifth layers 202, 218, 220 being laminated to each other, with the second and third layers 204, 216 being imbedded therein. Moreover, such a lamination process can result in the PV cell(s) 208 and associated wiring and connectors being imbedded, and thus at least partially sealed and/or protected, within the shingle 200, 200'.

Following heating, at block 118, surface texturization or characteristics 248 can be imparted onto the laminated assembly, and, more specifically, onto the upper surface 236 of the fifth layer 220 and, optionally, at least a portion of the fourth layer 218. For example, with respect to the embodiment depicted in FIG. 2B, in addition to imparting surface characteristics 248 onto the upper surface 236 of the fifth layer 220, such characteristics 248 can also be imparted onto at least a portion of the fourth layer 218 that are directly beneath the cutouts 222 of the fifth layer 220.

Such surface characteristics 248 can be imparted to provide the upper surface 236 of the fifth layer 220 with a rough, or uneven surface and appearance. For example, according to certain embodiments, the surface imparted characteristics 248 can correspond to providing the upper surface 236 with an appearance of a traditional roof shingle, including, but not limited to, an appearance or profile similar to a disbursement of granules or pebbles, among other uneven surface profiles, across at least the upper surface of traditional, or inactive, roof shingles. Thus, the imparted surface characteristics 248 on the upper surfaces 236 of the fifth layer 220, and possibly a portion of the upper surface 250 of the fourth layer 218, can correspond to a collection of ridges, depressions, and protrusions that may seek to emulate the appearance of granules or pebbles across at least the upper surface of traditional roof shingles, including, for example, traditional asphalt, wood, slate, and/or terra cotta shingles or slats, among other shingle and slat configurations. Such imparted surface characteristics 248 can also, according to certain embodiments, provide a louvered configuration or appearance to the solar shingle 200, 200'. Additionally, or alternatively, the imparted surface characteristics 248 can be configured to assist with light diffusion with respect to light that is being delivered to the PV cells 208.

According to certain embodiments, the surface characteristics 248 can be imparted onto at least the upper surfaces 232, 250, such as, for example, via a press die during a pressing operation when the shingle assembly is at, or near, the temperature at which the shingle assembly is heated in the oven. Alternatively, surface characteristics 248 can be imparted onto at least the upper surfaces 232, 250 as the shingle assembly is in the process of cooling from the temperature that the shingle assembly attained while being heated. According to other embodiments, the surface characteristics 248 can be imparted, or otherwise formed or molded into, the fifth layer 220 prior to the fifth layer 220 being positioned on the fourth layer 218.

Referencing FIG. 2C, rather than machining the fifth layer at block 112, and imparting surface characteristics at block 118, according to other embodiments one or more membranes 233 having surface characteristics 248' on at least an outer surface 235 of the membrane(s) 233 similar to the imparted surface characteristics 248 discussed above can be positioned beneath at least the fifth layer 220. Moreover, according to certain embodiments, at block 112, one or more translucent membranes 233, including, but not limited to, membranes 233 formed at least in part of glass, among other materials, can be formed. In order to provide the three-dimensional effect of similar to that attained by the previously discussed first and second portions 224, 226, the membrane 233 can include similar first and second portions 224', 226' in which the first portions 224' of the membrane 233 have a vertical height (in the direction generally indicated by "h" in FIG. 2C) that is greater than the corresponding vertical height of second portions 226', and in which the membrane 233 alternates between first and second portions 224', 226' along the width of the membrane 233. For example, according to certain embodiments, the first portions 224' can have a vertical height of about 4.5 mm to about 5 mm, while the lower portions 226' can have a height of about 3 mm to about 3.5 mm. Alternatively, according to other embodiments, rather than the first and second portions 224', 226' being part of the same membrane 233, each of the first and second portions 224', 226' can be separate or individual membranes 233. With such an embodiment, the individual first and second portions 224', 226' can generally allow for the formation of joints between the adjacent first and second portions 224', 226', which may allow the solar shingle 200, 200' to maintain a degree of flexibility. Surface characteristics 248' can be provided to the first and second portions 224', 226' of the membrane(s) 233 in a variety of manners, including being molded onto/into the outer surface 235 of the membrane(s) 233 or provided via a secondary machining or treatment operation, including, but not limited to, via bead blasting the outer surface 235 of the membrane(s) 233. Additionally, according to certain embodiments, the membrane(s) 233 can be positioned and sealed between the fourth and fifth layers 218, 220.

At block 120, at least the upper surface 236 of the fifth layer 220, and at least a portion of the upper surface 250 of the fourth layer 218 that is not covered by the fifth layer 220, can be painted. Such painting can also apply to other, external portions of the shingle 200, 200'. According to certain embodiments, such a painting operation can be configured to impart selected aesthetics to the solar shingle 200, 200', including, for example with respect to color properties. For example, the painting operation can be utilized to provide the solar shingle 200, 200' with an appearance of a new, or weathered, shingle, including, for example, a traditional asphalt single. Additionally, the paint process can be configured to impart the upper surface 236 of the fifth layer 220, as well as portion of the fourth layer 218 that is directly below the cutouts 222 of the fifth layer 220, with a waterline and/or faded appearance that can be observed on at least traditional asphalt shingles. According to certain embodiments, the painting operation can comprise spraying asphalt onto at least the upper surface 236 of the fifth layer 220 and, optionally, at least a portion of the fourth layer 218 that is beneath the cutouts 222. Additionally, such a painting process can, for example, include spraying the asphalt through a mesh material, including, but not limited to, through a wire mesh, so as to assist in providing an appearance similar to the solar shingle 200, 200' that is seen with traditional asphalt shingles. Such a mesh material can also be utilized to prevent paint from accumulating on certain areas of the solar shingle 200 below the mesh. By preventing, or limiting paint accumulation on certain areas of the solar shingle 200 via use of the mesh, the solar shingle 200 may have areas in which paint does not prevent, or minimally interferes with, sunlight passing into the shingle 200 and reaching the PV cells 208.

According to certain embodiments, the painting at block 120 can include painting, or otherwise applying a coating of, a light reflective material to at least portions of the solar shingle 200, 200'. For example, a layer of paint reflective paint or chrome, among other materials may be applied, including painted, to at least a portion of the solar shingle 200, 200', including but not limited to the upper wall 254 of the solar shingle 200, 200' or the fifth layer 200. Such a light reflective material may include areas in which sunlight may pass into the solar shingle 200, 200' so as to reach the PV cells 208. Thus, according to certain embodiments, a mesh material, as discussed above, may, for example, be utilized in the application of the reflective material so as to provide areas where the light reflecting material may not interfere with the passage of light into the solar shingle 200, 200'. The light reflective material can be utilized in at least an attempt to redirect incident light that may have entered the solar shingle 200, 200' but been reflected off the PV cells 208 or texture of the fourth or fifth layers 218, 220. Such redirection of the incident light may be utilized in an attempt to redirect the light to the PV cells 208. Further, an outer surface of the light reflective material can subsequently be painted, as discussed above, such as, for example, with a colored paint, so as to assist in providing the at least a portion of the exterior of the solar shingle 200, 200' with an aesthetic appearance similar to that seen with traditional shingles. Further, in certain embodiments, prior to being painted, the outer surface of the light reflective material can undergo a treatment, such as, for example, acid etching and sand blasting, among other treatments, that may assist in adhering the subsequently applied paint to the outer surface of the reflective light material.

According to certain embodiments, the solar shingle 200, 200' can also include a self-healing material. For example, according to certain embodiment, a layer, or regions, of self-healing material can be positioned between one or more of the above-discussed layers 202, 204, 216, 218, 220 and/or the substrate 206. Such self-healing material can assist filling in, or covering, one or more areas of the solar shingle 200, 200' that may become punctured, including becoming punctured during installation, including, for example, as a result of a nail being driven through the solar shingle 200, 200' at an incorrect location, among other damage. Additionally, or alternatively, according to certain embodiments, electronic arcing between electrode layers of a PV cell 208, including shorting related to puncture damage, could draw out self-healing material of the solar shingle 200, 200' along short-circuit path and/or sinter the self-healing material so as to assist in preventing further shorting.

Additionally, the method 100 can further include placing a selectively removable UV-blocking film on at least the upper surface 236 of the fifth layer 220, or an upper surface (FIG. 4) of the of the solar shingle 200, 200'. Such a protective layer can prevent and/or minimize the ability of the PV cells 208 within the solar shingle 200, 200' to produce electrical power. Moreover, such a protective layer can assist in relatively safe handling and installation of the solar shingle 200, 200', which may help protect the installer of the shingle 200, 200' from inadvertent electrical shock. Once installed, the protective layer can be removed from the solar shingle 200, 200'. The protective layer can be secured to the solar shingle 200, 200' in a variety of manners, including, but not limited to, via use of an adhesive or static electricity, among other manners of attachment.

FIG. 4 illustrates a perspective view of an exemplary solar shingle 200, 200' according to an embodiment of the subject application. As seen, the solar shingle 200, 200' includes opposing upper and bottom walls 254, 256 (FIG. 3), opposing first and second sidewalls 258, 260, and opposing bottom and upper sidewalls 230, 232. According to certain embodiments, the outer portion of the upper wall 254 can correspond to at least the upper surface 236 of the fifth layer 220 or associated paint or asphalt, as discussed above. Thus, the upper wall 254 can include surface openings, recesses, and/or cutouts 222, as discussed above with respect to block 112, as well as surface characteristics 248 discussed above with respect to block 118. The outer portion of the bottom wall 256 can correspond to at least a bottom surface of the first layer 202. Further, the sidewalls 230, 232, 258, 260 can comprise, for example, a collection of the corresponding sidewalls of the first through fifth layers 202, 204, 216, 218, 220 and substrate 206 and/or one or more coatings on such layers/substrate, including, but not limited to, an asphalt coating or paint.

According to certain embodiments, the solar shingle 200, 200' further includes a first connector 262 and a second connector 264. In the embodiments shown in at least FIGS. 4 and 5, the first connector 262 and the second connector 264 each have a first, positive electrical terminal 212a, and a second, negative electrical terminal 212b. While FIG. 4 illustrates a pair of terminals 212a, 212b, the connectors 262 can include other, or additional, terminals, including, for example, one or more terminals utilized for a feedback system, among other terminals. As shown in at least FIG. 5, the first connector 262, and, moreover, the associated terminals 212a, 212b, of a first shingle 200a can be adapted and positioned to be electrically coupled to at least a mating second connector 264, and thus the corresponding terminals 212a, 212b, of an adjacent, second solar shingle 200b that may be adjacent to the first sidewall 258 of the first shingle 200a. Similarly, the second connector 264, and, moreover, the associated terminals 212a, 212b, of the second connector 264 of the first shingle 200a, can be adapted and positioned to be electrically coupled at least to a mating first connector 262, and thus the associated terminals 212a, 212b, of another, or third adjacent solar shingle 200c that is positioned adjacent to the second sidewall 260 of the first shingle 200a. Thus, in such an example, the second and third solar shingles 200b, 200c are on opposing sides of the first shingle 200a. According to certain embodiments, the terminals 212a, 212b can be positioned on, and/or at least partially embedded into, the substrate 206.

The terminals 212a, 212b of the first connector 262 can be configured to matingly engage, or be otherwise be electrically coupled, to a corresponding terminal 212a, 212b of the second connector 264 of another shingle 200, 200', and vice versa, in a variety of different manners. For example, as seen in at least FIGS. 4-8, according to certain embodiments, the first connector 262 of a solar shingle 200a-c can be arranged to be positioned to overlap, or otherwise generally form a lap joint, with the second connector 264 of an adjacent solar shingle 200a-c, and vice versa. According to such an embodiment, one of the first and second connectors 262, 264 of a solar shingle 200a-c is vertically positioned above, and overlaps, the other of the first and second connectors 262, 264 of another solar shingle 200a-c.

Figures 5, 6:
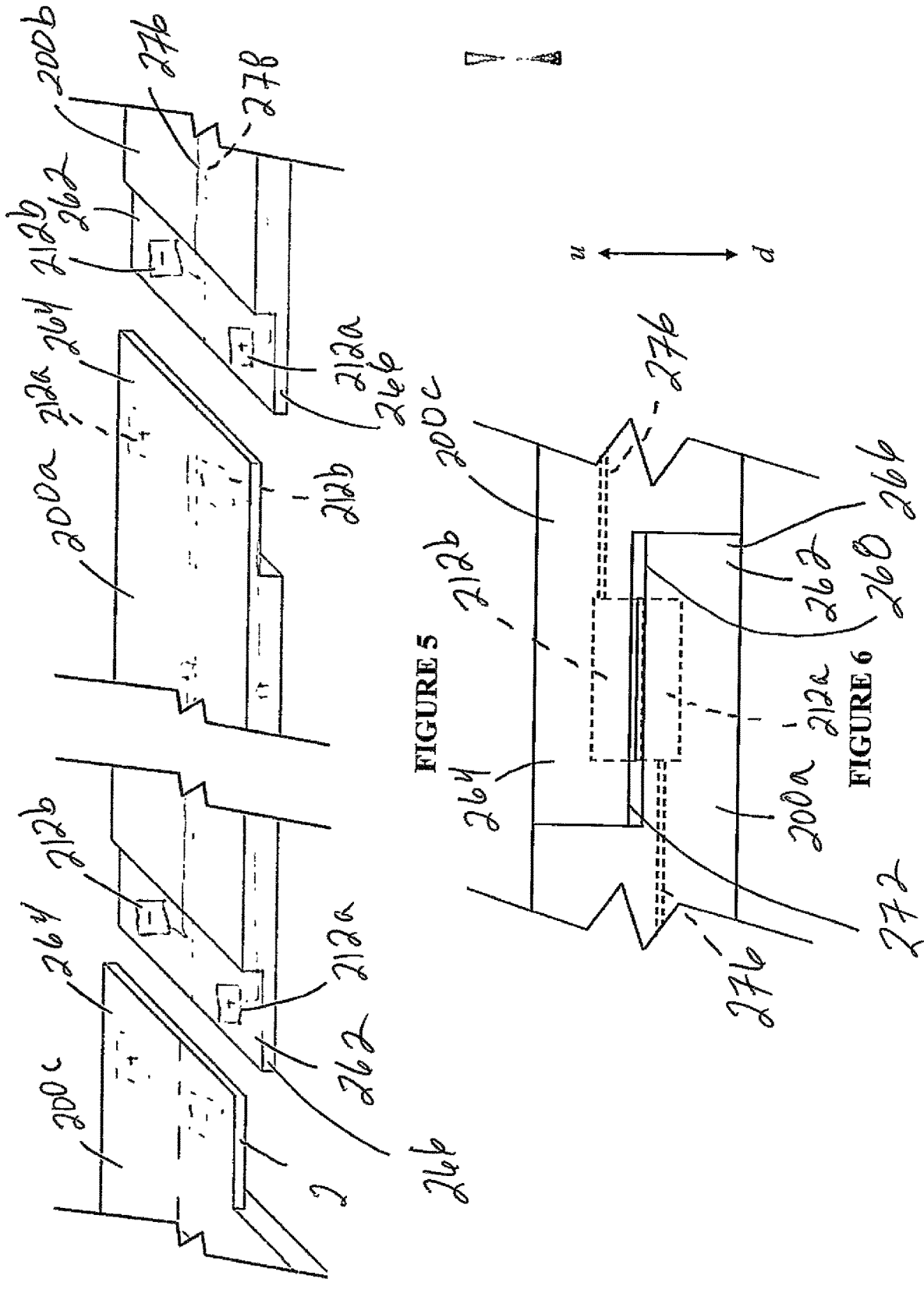
FIGS. 5-8 illustrate views of portions of a plurality of solar shingles arranged to be electrically coupled via an overlapping arrangement of, or lap joint between, electrical contacts of the solar panels.

In the embodiments shown at least FIGS. 4 and 6, the first connecter 262 can be configured as a tab 266 that outwardly protrudes along a portion, but not necessarily all, of one of the first and second sidewalls 258, 260, and be vertically offset relative to, or extend to a height that is lower than, the upper wall 254 of the solar shingle 200, 200'. With such an embodiment, the terminals 212a, 212b of the first connector 262 can be exposed from a generally upwardly facing surface 268 of the tab 266 (as upward is generally indicated by the direction "u" in FIG. 6), including, but not limited to, an upper surface of the substrate 206. Further, with respect to some embodiments, the second connector 264 can be configured as a slot 270 that extends inwardly from only a portion of the opposing second or first sidewall 258, 260, and which also extends in a direction from the upper sidewall 232 and toward, but not reaching, the bottom sidewall 230. Accordingly, the terminals 212a, 212b of the second connector 264 can be oriented along a generally downwardly facing surface 272 (as downward is generally indicated by the direction "d" in FIG. 6) of the second connector 264, including, but not limited to, a downwardly directed surface of the substrate 206. In such an embodiment, the tab 266 of a first shingle 200a can be received in the slot 270 of another solar shingle 200b, or vice versa, such that the terminals 212a, 212b of the first connector 262 of the first solar shingle 200a can be electrically coupled to the terminals 212a, 212b of the second connector 264 of the other solar shingle 200b.

According to certain embodiments, the first and second connectors 262, 264 shown in at least FIGS. 4-6 can be positioned at a vertical location about the solar shingle 200 such the first and second connectors 262, 264 will be covered any another shingle 200 in an another adjacent, and vertically higher, row. Such covering of the connectors 262, 264 of the solar shingles 200 by other, vertically adjacent shingles 200 can assist in protecting the connectors 262, 264 from the environment.

Figures 7, 8:
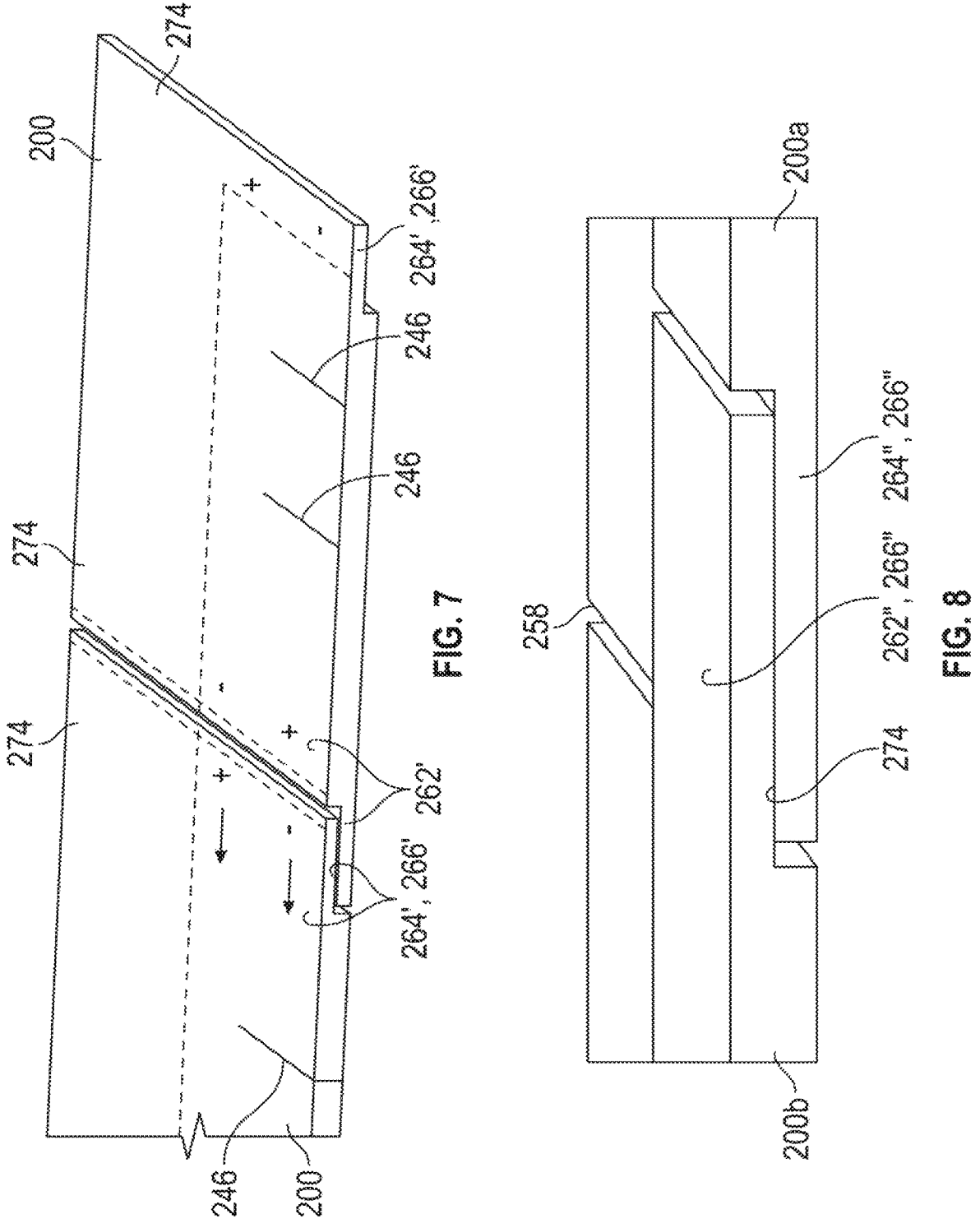

Alternatively, as seen in FIG. 7, according to other embodiments, unlike the tab 266 seen in FIGS. 4 and 5, connectors 262', 264' can be a pair of tabs 266' that can extend along generally the entire length of the first and second sidewalls 258, 260. Further, the terminals 212a, 212b of one tab 266' can be facing generally downward so as to be able to be coupled to generally upwardly facing terminals 212a, 212b of the other tab 266'. Additionally, the tabs 266' can extend along generally the entire length of the first and second sidewalls 258, 260. The mating tabs 266' can also have a thickness such that when one tab 266' is positioned over the other tab 266', the combined thickness of the tabs 266' is generally the same as the thickness between the opposing upper and lower surfaces upper and bottom walls 254, 256 of the solar shingle 200, 200'. Further, according to such an embodiment, a region or strip 274 of the overlapping tabs 266' can provide an area (e.g., a nail strip), or, alternatively, a nail strip can extend onto the overlapping tabs 266', for receipt of nails used to secure the solar shingles 200, 200' to each other and/or the associated structure onto which the shingles 200, 200' are being installed.

FIG. 8 illustrates another overlapping embodiment similar to that shown in at least FIGS. 4 and 5 having a first connector 262" in the configuration of a tab 266", but which the tab 266" is instead vertically offset from the bottom wall 256 of the solar shingle 200, 200'. Additionally, the second connector 264" is instead vertically offset from the upper wall 254 of the solar shingle 200, 200'. Thus terminals 212a, 212b of the first connector 262" are positioned along a downward facing surface 272, such as, for example, a downward facing surface of the substrate 206, and the terminals 212a, 212b of the second connector 264" are positioned on a generally upwardly facing surface 268". Further, as seen in FIG. 8, the second connector 264" can be inwardly recessed from one sidewall 258 of a shingle 200a in a general direction of, but not reaching, the opposing sidewall 260 of that same shingle 200a'. While FIG. 8 illustrates an embodiment in which the tabs 266" of the solar shingles 200a, 200b extend along only a portion of the associated first or second sidewall 258, 260, the tabs 266" in FIG. 8 can also, similar to the embodiment shown in FIG. 7, and thus can be configured to extend generally extend along the entirety of the associated first or second sidewalls 258, 260, respectively.

Figures 15, 16:
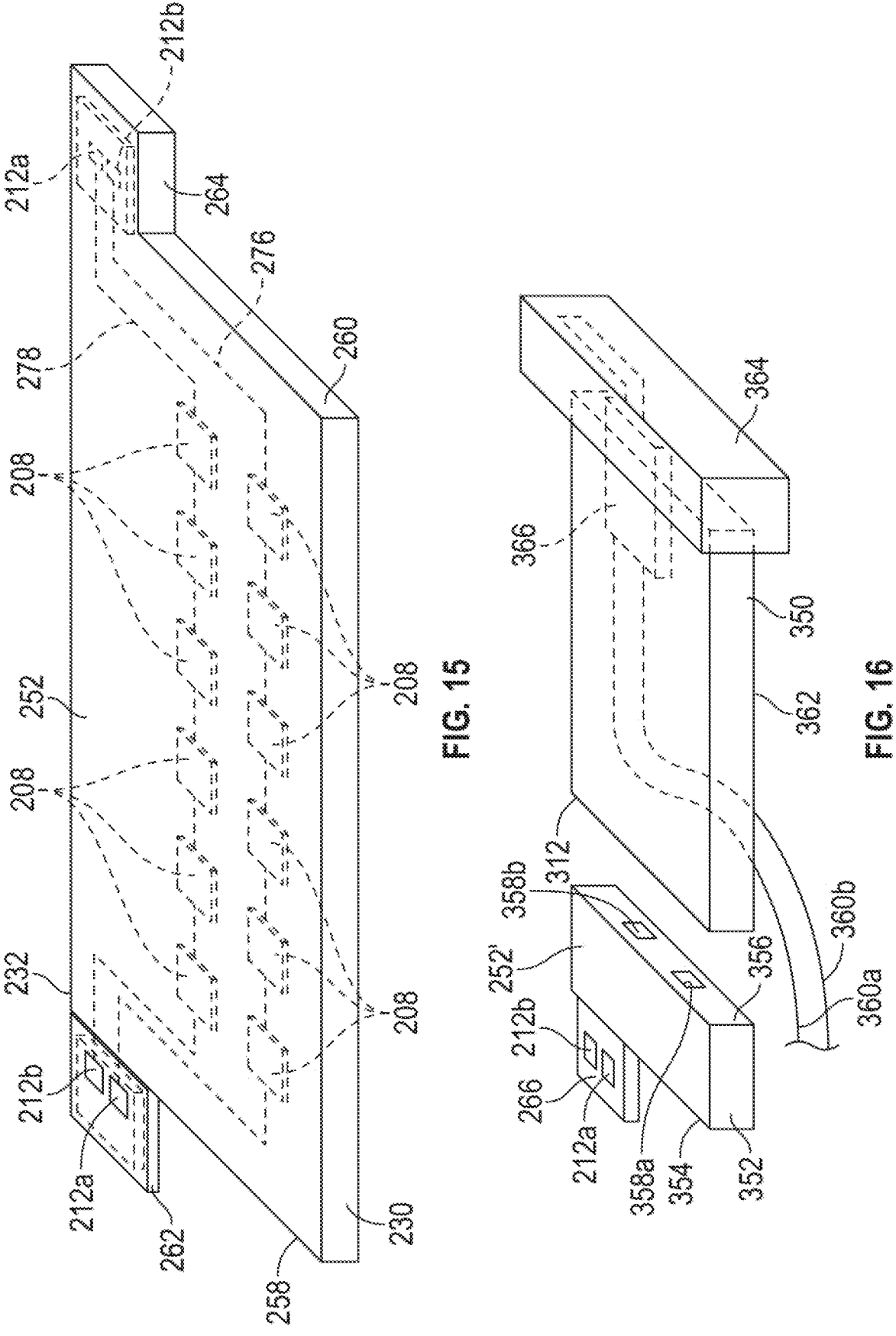
FIG. 15 illustrates a perspective view of an embodiment of a solar shingle having a first PV string and second line that has PV cells.
FIG. 16 illustrates a representation of an inactive, end solar shingle coupled to a micro inverter and flashing and a shingle adapter for coupling to a trimmed side of the solar shingle.

Referencing FIGS. 2A, 2B, 4, and 13-15, according to certain embodiments, the solar shingle 200, 200' can comprise a first, PV string 276 comprising a plurality of PV cells 208 electrically coupled to each other. The illustrated solar shingle 200, 200' can further include a second line 278, which may or may not be a second PV string. Moreover, as seen in FIGS. 4 and 14, according to certain embodiments, the second line 278 may not include any PV cells 208, and thus, may not be a PV string. For example, the second line 278 may be a return line, wire, or cable through which electrical power produced by, and collected from, the PV cells 208 in the first PV string(s) 276 of one or more solar shingles 200, 200' can be delivered back through the solar shingle(s) 200, 200' for delivery to an inverter. However, as seen in at least FIG. 15, according to certain embodiments, the second line 278 can be a PV string that includes one or more PV cells 208 in addition to the associated wire(s) 214. While FIG. 15 illustrates, for at least purposes of discussion, the second line 278 and associated PV cells 208 being positioned at or around a mid-section of the solar shingle 200, at least the PV cells 208 along the second line 278, and associated wires 214, can be positioned within, or otherwise confined to, the PV cell zone 228, as discussed above.

The size of the PV cells 208 can be based, at least in part, on whether the second line 278 does, or does not, include PV cells 208. For example, according to certain embodiments in which the only the first string 276, and not the second line 278, includes PV cells 208, the PV cells 208 may, for example, be M6 solar cells, among other sized PV cells. Further, according to certain embodiments in which both the first string 276 and the second line 278 contain PV cells 208, and thus the second line 278 is a second PV string, the PV cells 208 for one or both of the first string 276 and/or second line 278 can be half cells that may, for example, have around half the size of M6 cells, among other sizes.

According to certain embodiments, in the absence of a jumper 280 (FIGS. 9A and 9B) a plurality of solar shingles 200 can be directly or indirectly electrically coupled to each other such that current may flow in a first direction through the first string 276 of each of the solar shingles 200 before flowing in a second, opposite direction along the second lines 278 of each of the solar shingles 200. As indicated by at least FIGS. 3, 5, and 15, the first string 276 can be generally directly electrically coupled or attached to a terminal 212a, 212b of each of the first and second connectors 262, 264 of the same solar shingle 200, one of the terminals 212a, 212b corresponding to a positive charge (+), and the other terminal corresponding to a negative charge (−). The second line 278 can therefore be generally directly electrically coupled or attached to terminals 212a, 212b of the first and second connectors 262, 264 other than the terminals 212a, 212b to which the first string 276 is generally directly electrically coupled or attached. Thus, with respect to the connections for the second line 278, similar to the first string 276, one of the terminals 212a can correspond to a positive charge (+), and the other terminal 212b can correspond to a negative charge (−).

Figures 9A, 9B, 10:
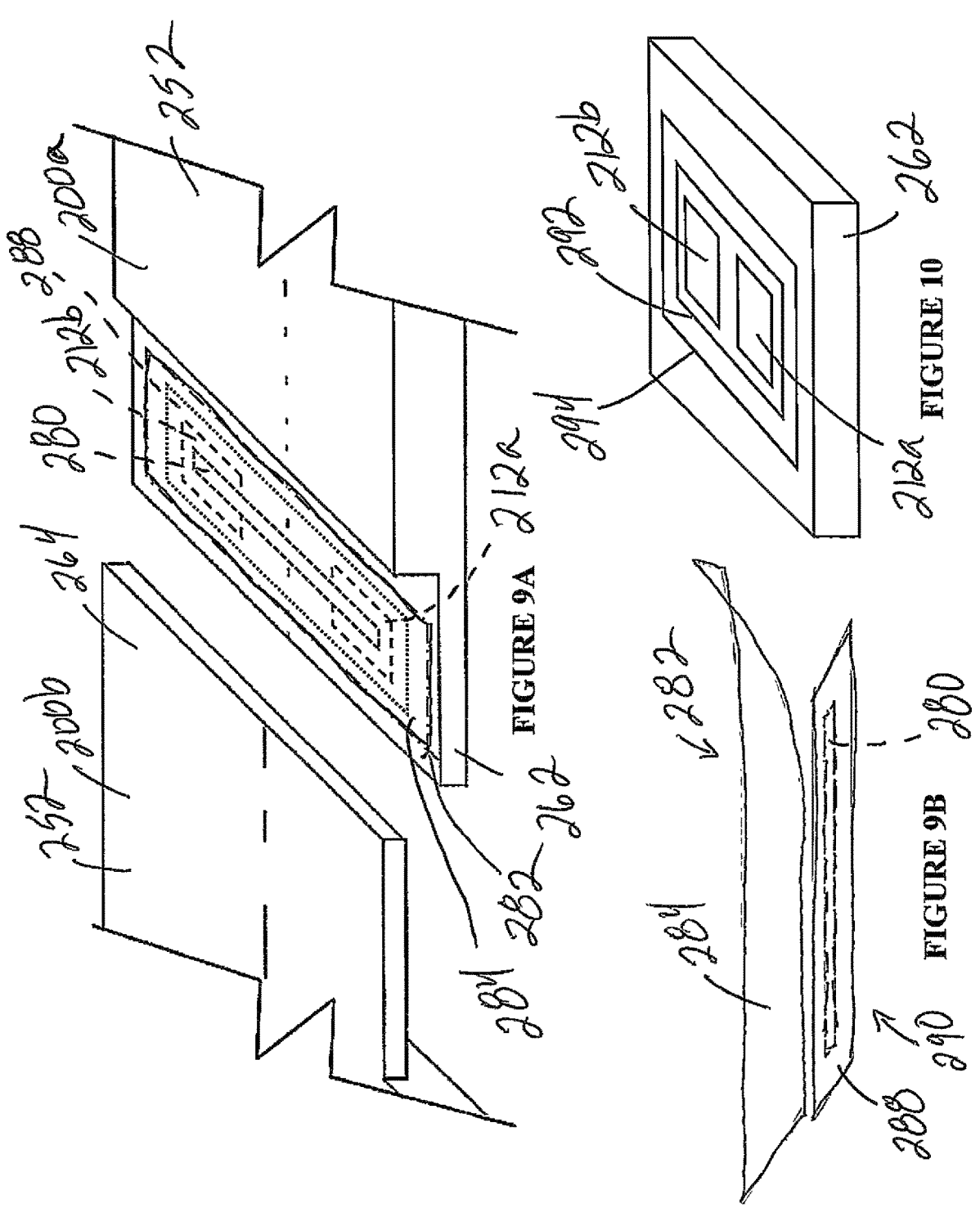
FIGS. 9A and 9B illustrate a patch assembly for a connector of a solar shingle according to an illustrated embodiment of the subject application.
FIG. 10 illustrates a perspective view of connector having terminals and a plurality of beads or rings of adhesive or sealant.

Referencing FIGS. 9A and 9B, at least prior to installation, a removable pad or patch assembly 282 can be positioned on each of the first connector 262, as well as another patch assembly 282 on the second connector 264. The patch assembly 282 can, for example, provide at least protective covering for, or over, at least the first and second terminals 212a, 212b of the first and second connectors 262, 264. According to certain embodiments, the patch assembly 282 can include a generally non-conductive protective outer layer 284, such as, for example, a relatively thin layer of film that may, or may not, be similar to the EVA or ETFE material discussed above. Moreover, the protective outer layer 284 can be constructed from a material that can minimize the potential for installers of the shingles 200 receiving an electrical shock that may otherwise occur if the associated terminals 212a, 212b were uncovered. According to certain embodiments, the protective outer layer 284 can selectively removable from the associated first or second connector 262, 264.

The patch assembly 282 can also include a jumper 280 positioned between at least the protective outer layer 284 and at least the first and second terminals 212a, 212b of the connector 262, 264. The jumper 280 can provide a conductive pathway that electrically couples the first and second terminals 212a, 212b of the same connector 262, 264, which may have opposing polarities. According to certain embodiments, the jumper 280 can be embedded in a substrate 288, including, but not limited to, a non-conductive substrate, thereby providing a jumper substrate 290 having both the substrate 288 and the jumper 280. According to certain embodiments, the substrate 288 can, for example, comprise a fiberglass board, or rubber, among other generally non-conductive materials. Further, similar to the protective outer layer 284, the jumper 280 or jumper substrate 290 can be adhered to the solar shingle 200, 200'. For example, the protective outer layer 284 and the jumper substrate 290 can be secured to an adjacent connector 262, 264 via use of one or more rings of tar or a tar-like sealant material. Further, according to certain embodiments, the jumper 280 or jumper substrate 290 may be selectively removable independent of the removal of the protective outer layer 284, while, according to other embodiments, the jumper 280 or jumper substrate 290 may be removed with the removal of the protective outer layer 284.

Referencing FIG. 10, according to certain embodiments, the associated first or second connector 262, 264 can include one or more layers, beads, or rings of adhesive 292, 294, including, but not limited to, one or more rings of tar or a tar-like sealant material. The one or more rings of such adhesives 292, 294 can, for example, be applied around at least one or both of the first and second terminals 212a, 212b. According to embodiment illustrated in FIG. 10, a first, inner ring of adhesive 292 can be positioned around the terminals 212a, 212b and be used to assist in securing at least the jumper substrate 290 to the connector 262, 264 at a location at which the jumper 280 is in contact with both of the associated terminals 212a, 212b. A second, outer ring of adhesive 294 can extend around at least a portion of the outer periphery of the inner ring of adhesive 292, and can be utilized to secure the protective outer layer 284 to the connector 262, 264 at a position at which the protective outer layer 284 covers a least a portion of the jumper substrate 290 and/or the jumper 280 and the terminals 212a, 212b. In the event the protective outer layer 284 is removed from the connector 262, 264, the second, outer ring of adhesive 294 can at least assist in securing the connector 262, 264 to a mating connector 262, 264 of another, adjacent shingle 200, as well as provide a seal therebetween. Similarly, if both the protective outer layer 284 and the jumper substrate 290 were removed, both the first inner ring of adhesive 292 and the second outer ring of adhesive 294 can be utilized to at least assist in securing the connector 262, 264 of a solar shingle 200a to a mating connector 262, 264 of another, adjacent shingle 200b, as well as provide a seal therebetween.

Whether the protective outer layer 284 and the jumper substrate 290 are, or are not, selectively removed from a particular solar shingle 200 can depend, at least in part, on the location at which the solar shingle 200 will be installed, and/or will be installed in connection with other shingles 200. For example, referencing the example discussed above with respect to FIG. 5, the protective outer layer 284 and jumper substrate 290 can be removed from the second connector 264 of the second shingle 200*b* and the protective outer layer 284 and the jumper substrate 290 can be removed from the first connector 262 of the first shingle 200*a* so that the associated terminals 212*a*, 212*b* of the first and second shingles 200*a*, 200*b* can come into electrical contact with each other. Similarly, in this example, the protective outer layer 284 and the jumper substrate 290 can be removed from the second connector 264 of the first shingle 200*a* and the protective outer layer 284 and the jumper substrate 290 can be removed from the first connector 262 of the third shingle 200*c* so that the associated terminals 212*a*, 212*b* of the first and third solar shingles 200*a*, 200*c* can come into electrical contact with each other. However, in some instances, one of the first and second connectors 262, 264 of a solar shingle 200 may not have another solar shingle 200 to be directly electrically coupled, including, for example, when a solar shingle 200 is at the end of a row of solar shingles 200. In such an embodiment, at least the jumper substrate 290 can remain on the solar shingle 200 such that the current delivered to a terminal 212*a* of a connector 262, 264 can be delivered, via the jumper 280 from the first terminal 212*a* to the second terminal 212*b*, or vice versa, of the same connector 262, 264. In such a situation, the jumper 280 can be utilized in the delivery of current from the end of the first string 276 to the beginning of the second line 278.

Figures 11, 12:
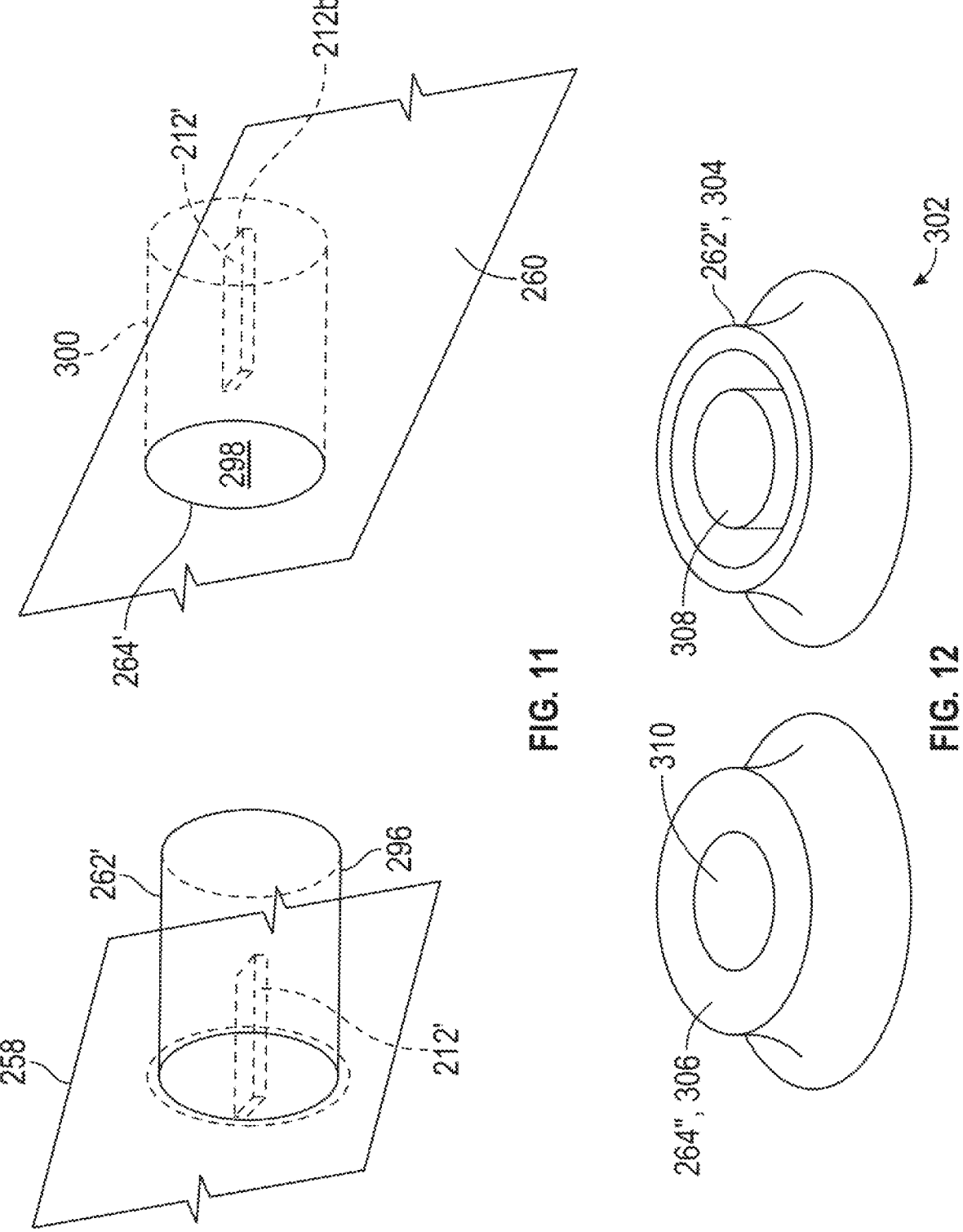
FIG. 11 illustrates a side perspective view of mating electrical connectors for adjacent solar shingles in the form of male and female plugs.
FIG. 12 illustrates an upper side view of mating electrical connectors or fasteners for adjacent solar shingles in the form of button connectors.

While the foregoing has been discussed with respect to first and second connectors 262, 264 being configured for an overlapping arrangement, and/or which generally provide a lap joint between adjacent portions of neighboring solar shingles 200, the connectors 262, 264 can have a variety of other configurations. For example, as seen in at least FIGS. 11 and 14, according to certain embodiments, the connectors 262', 264' can comprise a first, male connector 262' that extends from one of the first and second sidewalls 258, 260, and a second, female connector 264', that is inwardly recessed into the solar shingle 200 from the other of the first and second sidewalls 258, 260. According to certain embodiments, the terminals 212*a*, 212*b*, among other terminals that may be included with connectors 262, 264, 262', 264', such as, but not limited to terminals for a feedback system or wire, collectively 212' in FIG. 11, of the first, male connector 262' may, or may not, housed within an outer body 296 that is adapted to be received in an orifice 298 of the second, female connector 264', and/or within a terminal housing 300 of the second female connector 264' that extends at least partially into the solar shingle 200, wherein the associated terminals 212' of the female connector 264' may be located. Further, while FIGS. 11 and 14 illustrate a single first, male connector 262' and a single mating second female connector 264' that can house, collectively, the associated terminals 212', one or both the first and second connectors 262', 264' can include similar, individual constructions for each associated terminal 212*a*, 212*b*. Additionally, the male connector 262' and/or female connector 264' may include one or more seals, such as, for example, an O-ring, that can be sized to prevent the ingress of water or moisture into the connection between the male and female connectors 262', 264'.

FIG. 12 illustrates another embodiment of the connectors 262", 264", or, alternatively, individual terminals 212*a"*, 212*b"*, in the form of a fastener 302 having a first portion or section 304 and a second portion or section 306. Moreover, in the illustrated embodiment, the first portion 304 of the fastener 300 can comprise a male portion, while the second portion 306 can be a female portion that is adapted to receive at least a portion of the first portion 304. Further, at least the portion of the first and second portions 304, 306 of the fastener 300 can, similar to the above-discussed embodiments, comprise an electrically conductive material, including, but not limited to, metallic materials and associated alloys, including, but not limited to, copper, silver, aluminum, brass, nickel, and/or zinc, among other materials. In the illustrated embodiment, the fastener 300 is a snap button such that one of the first and the second portion 304, 306 includes a stud 308 and the other of the first and second portions 304, 306 incudes at least the mating socket 310 in which the stud 308 can be selectively received. In such an embodiment, the fastener 300, including for example at least one of the first and second portions 304, 306, can include one or more seals, such as, for example, an O-ring, that can be sized to prevent the ingress of water or moisture into the connection between the mating connections of the fastener 300. Further, according to certain embodiments, the stud 308 and mating socket 310, among other portions of the first and second portions 304, 306, can include, or comprise a plurality of concentric rings that may correspond to different terminals for the flow of electrical power. For example, the stud 308 and socket 310 can include mating positive and negative terminals, among other possible terminals, including, but not limited, to a terminal for a feedback system or wire. According to such an embodiment, the terminals may be separated from each other by an electrically insulating material.

The selection of the type or configuration of connectors 262, 264 utilized with the solar shingle(s) 200, 200' can be based on a variety of different criteria. For example, referencing FIG. 14, according to certain embodiments, male and female connectors 262', 264' similar to those shown in FIG. 11 can be utilized in the depicted embodiment so as to assist in the at least the first string 276 and/or second line 278 being at a location in the solar shingle 200 that is outside of a nail strip 234. According to such an embodiment, the nail strip 234 can correspond to a location at which one or more nails are to be driven through at least the solar shingle 200 in connection with securing the solar shingle 200 to another solar shingle 200 and/or the associated structure to which the solar shingle 200 is being installed. The nail strip 234 at the location shown in FIG. 14, and, moreover, along a mid-section of the solar shingle 200, can be utilized with a variety of different types of solar shingles 200, 200' discussed throughout this disclosure. Further, according to certain embodiments in which the connectors 262, 264 have configurations similar to those shown in at least FIGS. 4, 9A, 13, and 15, and the shingle 200 is configured for placement of a generally horizontally elongated nail strip 234 similar to the nail strip 234 along a mid-section of the shingle 200, as shown in FIG. 14, the connectors 262, 264 can be vertically positioned at a location between the upper surface 252 of the solar shingle 200 and a nail strip 234, thereby allowing the connectors 262, 264 to be covered by shingles in a different row, as discussed above. However, as discussed herein, other nail regions or nailing tabs can be provided at a variety of other locations, including, but not limited at or around the upper sidewall and/or along a portion of the first and/or second sidewalls 258, 260.

Referencing FIG. 16, in at least some instances, including, for example, with respect to the last or end solar shingle 350 in a row of solar shingles 200, a size, such as, for example, a width of the end solar shingle 350, can be reduced via cutting or trimming of the end solar shingle 350. For example, as seen in FIG. 16, in at least certain instances, a width between the first and second sidewalls 258, 260 of the end solar shingle 350 can be trimmed, including, for example, via cutting of the end solar shingle 350, so as to replace at least one of the first and second sidewalls 258, 260, with a trimmed wall 312. Such trimming of the end solar shingle 350 can thus result in at least one of the first and second connectors 262, 264, and associated terminals 212a, 212b, being removed from the end solar shingle 350. For example, in the example illustrated in FIG. 16, the end solar shingle 350 has been trimmed such that at least the first sidewall 258 and the first connector 262, as well as the associated terminals 212a, 212b, have been removed from the end solar shingle 350. In such a situation, an adapter shingle 352 can be utilized to electrically couple the trimmed end solar shingle 350 to an adjacent solar shingle 200.

Generally, the adapter shingle 352 can have at least one connector 262, 264, 262', 264', 262", 264". Further, at least the exterior appearance or aesthetics of the adapter solar shingle 352, including along the upper surface 252', as well as at least a distance between the bottom and upper sidewalls 20, 232 can be generally similar to the adjacent shingles 200, 350. Thus, for example, the upper surface 252' of the adapter shingle 352 can have a configuration and/or appearance that is similar to that of other solar shingles 200, 352. However, the adapter solar shingle 352, as well as the end solar shingle 350, may, or may not, include PV cells 208.

At least one of the first and second sidewalls 354, 356 of the adapter shingle 352 can include one or more adapter terminals 358a, 358b that are configured to be electrically coupled to a first wire or line 360a and/or a second wire or line 360b of the end solar shingle 350, including, for example, a portion of the first and/or second lines 360a, 360b that may be exposed at or around the trimmed wall 312 of the trimmed solar shingle 350. The adapter terminals 358a, 358b are also electrically coupled to the terminals 212a, 212b of the first or second connector 262, 264 of the adapter shingle 352 that may be positioned on a sidewall 354, 356 of the adapter shingle 352 that is different than the sidewall 354, 356 to which the adapter terminals 358a, 358b are located. For example, the embodiment illustrated in FIG. 16, the adapter shingle 352 includes adapter terminals 358a, 358b positioned along a second sidewall 356, and a first connector 262 having associated terminals 212a, 212b along the first sidewall 354 of the adapter shingle 352. Further, according to certain embodiments, the adapter terminals 358a, 358b can each have a clamping feature, including a clamping feature that may be tightened by a mechanical fastener or biasing element, to which lines 360a, 360b from the end solar shingle 350 can be secured to the associated adapter terminal 358a, 358b. Additionally, as seen in FIG. 16, according to certain embodiments, the adapter terminals 358a, 358b can be oriented in a direction that is generally orthogonal to the terminals 212a, 212b of the first and/or second connectors 262, 264.

According to other embodiments, the end solar shingle 350 does not include PV cells 208. Thus, unlike solar shingles 200 having at least one PV cells 208, which can be generally referred to as active solar shingles 200, the end solar shingle 350 can be considered an inactive solar shingle 350. As opposed to inactive shingles that are traditional shingles that lack electrical components, including, wires or lines relating to the transmission of electrical current, inactive solar shingles 350 can have constructions similar to the other solar shingles 200 discussed above but at least with exception that the inactive solar shingles do not include a PV cell 208. According to certain embodiments, at least portions of the first and second lines 360a, 360b of an inactive shingle 350 can be attached to the bottom wall 362 in a manner that can accommodate selective separation of those portions of the first and second lines 360a, 260b from the bottom wall 362, while other portions of the associated first and/or second lines 360a, 360b can remain secured against, or to, the shingle 350. According to such an embodiment, the user may selectively separate either or both of the first and second lines 360a, 360b, either individually or at the same time, while maintaining an electrical coupling between the first and second lines 360a, 360b and an associated terminal 212a, 212b of one or more of the connectors 262, 264. Thus, for example according to certain embodiments, in the embodiment shown in FIG. 16, at least a portion of the first and second lines 360a, 360b can be separated from at least a portion of the inactive solar shingle 350 that is to be removed via trimming. The inactive solar shingle 350 can then be trimmed to provide the trimmed wall 312. The portion of the first and second lines 360a, 360b separated from the inactive solar shingle 350 may be of a length so at to accommodate first and second lines 360a, 360b being electrically coupled and/or attached to the corresponding adapter terminals 212a, 212b. According to other embodiments, rather than utilizing an adapter shingle 352, the inactive solar shingle 350 can be trimmed or cut along a side of the inactive solar shingle 350 that is not adjacent to another active solar shingle 200. In such an embodiment, the pulled or separated first and second lines 360a, 360b can extend, or otherwise be coupled to other wires that extend, through a neighboring flashing 364, eaves, or gutter, among other structures of a roof or building, and be delivered to an inverter 366. With such embodiments, the uncut side of the inactive solar shingle 350 can have a connector 262, 264 that accommodates the inactive solar shingle 350 being coupled to another solar shingle 200, 200'.

At least one of the first and second connectors 262, 264, or other portion of the solar shingle 200, 200', 350, can be electrically coupled to an inverter 366, including, for example, a micro-inverter or a string inverter, among others. The inverter 366 is adapted to convert direct current (DC) generated by the one or more strings of one or more solar shingles 200 to alternating current (AC). For example, with respect to the non-limiting example shown in FIG. 16, the second connector 264 of a last solar shingle 200, 350 in a series or collection of solar shingles 200 is generally directly coupled to an inverter 366 in the form of a micro-inverter. However, the inverter 366 can be electrically coupled to a solar shingle 200, 250, or a string of solar shingles 200, 350, in a variety of different manners and locations. According to certain embodiments, an inverter 366 can be positioned at the end, or otherwise coupled to each end of every row of solar shingles 200, thus allowing each row of shingles 200 to operate as a single solar panel. Further, according to at least such an embodiment, both terminals 212a, 212b of the connector 262, 264, 262', 264', 262", 264" at the end of the row can be coupled to the inverter 366.

The alternating current outputted from the inverter 366 can then be sent to another portion of an associated power management system, including, for example a battery, and system for selling back electrical power to a utility grid, and/or to a converter that may convert the AC current to DC current for use by one or more appliances, devices, and/or electrical systems of the building(s) or structure(s) associated with the solar shingles(s) 200, 200', 350.

While the inverter 366 depicted in FIG. 16 is shown hidden, or beneath, an inactive solar shingle 350, the inverter 366 can be positioned at a variety of locations. For example, according to certain embodiments, the inverter 366 can be attached to, embedded within, and/or positioned beneath active solar shingles 200, 200', flashing 364, eaves, and/or soffits, or positioned in an area beneath the roof (e.g. the attic) or other structure on which the solar shingles 200, 200' are installed, as well as any combination thereof. Such flashing 364 may be generally similar to flashing traditionally installed on roofs or other structures. Thus, for example, the flashing 364 can be generally configured to provide a seal to prevent passage of water through seems between the solar shingles 200, 200' and an adjacent portion of the structure or roof, including chimneys, vents, pipes, windows, and/or walls. Aside from the inverter 366, the flashing 364 can be constructed for a variety of different materials, including, but not limited to, metal, plastic, rubber, and impregnated paper, as well as combinations thereof. Additionally, whether the flashing 364 does, or does not, include the inverter 366, at least some of the flashing 364 can include one or more electrically conductive elements, such as, for example, wires, that may be used in the transmission of electricity, and moreover, electrical current generated by the solar shingles 200, 200' to other portions of the associated power management system.

Figure 17:
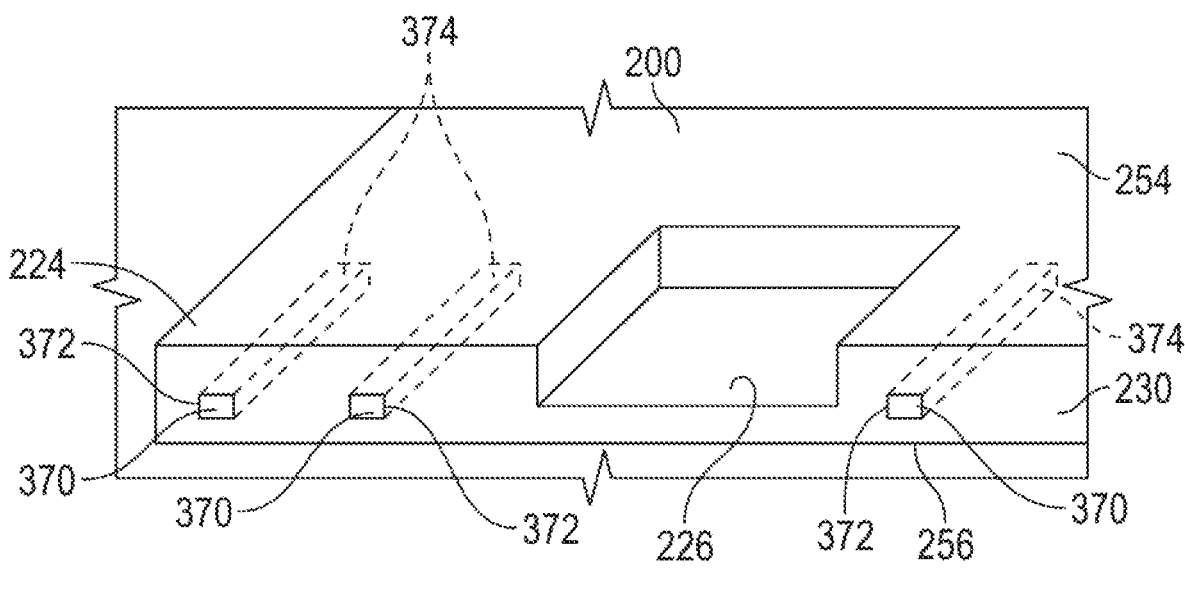
FIG. 17 illustrates a solar shingle having at least one exhaust portal or vent.

Referencing FIGS. 2B and 17, the solar shingle 200, 200' can include a number of different features that can enhance the stiffness of the solar shingle 200, 200' and/or to assist the solar shingle 200, 200' to maintain a shape and/or size when subjected to operating conditions. For example, as shown in FIG. 2B, according to certain embodiments, one or more stiffeners or stiffening ribs 368 can be positioned between two or more of the first through fifth layers 202, 204, 206, 216, 218, 220 and/or the layers 202, 204, 206, 216, 218, 220 and the substrate 206. Alternatively, such stiffeners 368 can, for example, be embedded in the substrate 206. Such stiffeners 368 can be constructed from a variety of metallic or non-metallic materials, and, more specifically, materials that may be generally resistant to bending or deflection. Additionally, the stiffeners 368 can, optionally, be utilized with any embodiment of a solar shingle discussed herein.

Alternatively, or additionally, the solar shingle 200, 200', 350 can be exposed to relatively high temperatures associated, for example, with the position of solar shingle 200, 200', 350 in direct sunlight, operation of the PV cells 208, and/or the passage of electrical current though the first string 276 and/or second line 278. Accordingly, as shown for example in FIG. 17, in an attempt to at least dissipate some heat from the solar shingles 200, 200', 350 and/or facilitate a flow of air that may transfer heat away from the solar shingles 200, 200', 350, one or more, if not all, of the solar shingles 200, 200', 350 can include at least one, or a plurality, of exhaust portals or vents 370. According to the illustrated embodiment, each vent 370 can have an opening 372 in at least one sidewall 230, 232, 258, 260 of the solar shingle 200, 200', 350, and a passageway 374 that extends inwardly from the opening 372 and into the solar shingle 200, 200', 350. In the illustrated embodiment, the opening 372 is positioned on the bottom sidewall 320 of the solar shingle 200 at a position between the upper and lower walls 254, 256 of the solar shingle 200, 200', 350, and inwardly extends generally in the direction of, but does not reach, the upper wall 254, among other directions. As seen in FIG. 17, aside from being in fluid communication with the opening 372, and thus in fluid communication with ambient environment through the opening 372, the passageway 374 is generally encapsulated from all sides within the solar shingle 200, 200', 350. The vents 370 can have a variety of cross sectional shapes, including, for example, square, rectangular, circular, non-circular, and oval, among others. Additionally, the vents 370 can, optionally, be utilized with any embodiment of a solar shingle discussed herein. Additionally, according to other embodiments, the vents 370 may extent through opposing sidewalls 230, 232, 258, 260 and positioned to be adjacent to, and in fluid communication with, vents 370 in neighboring solar shingles 200, 200' so that an airflow pathway can extend through a plurality of solar shingles 200, 200'. For example, according to certain embodiments, the airflow pathway provided by the vents 370 of neighboring solar shingles 200, 200' being generally directly adjacent to, and in fluid communication, with other vents 370 can provide an airflow pathway for air to circulate within, and across, a row of neighboring the solar shingles 200, 200'. According to other embodiments, the vent(s) 370 in each shingle 200, 200' can have a plurality of openings 372, such as, for example, first and second openings 372 in the same or different sidewalls 230, 232, 258, 260, with each of the openings 372 being in fluid communication with each other via the associated passageway 374. The passageway 374 can further extend in variety of different directions, and to a variety of different distances from adjacent sidewalls 230, 232, 258, 260 of the solar shingle 200, 200'. Additionally, according to certain embodiments, one or more passageways 374 may intersect, and thus, be in fluid communication, with one or more other passageways 374 in a single solar shingle 200, 200'.

Figure 18:
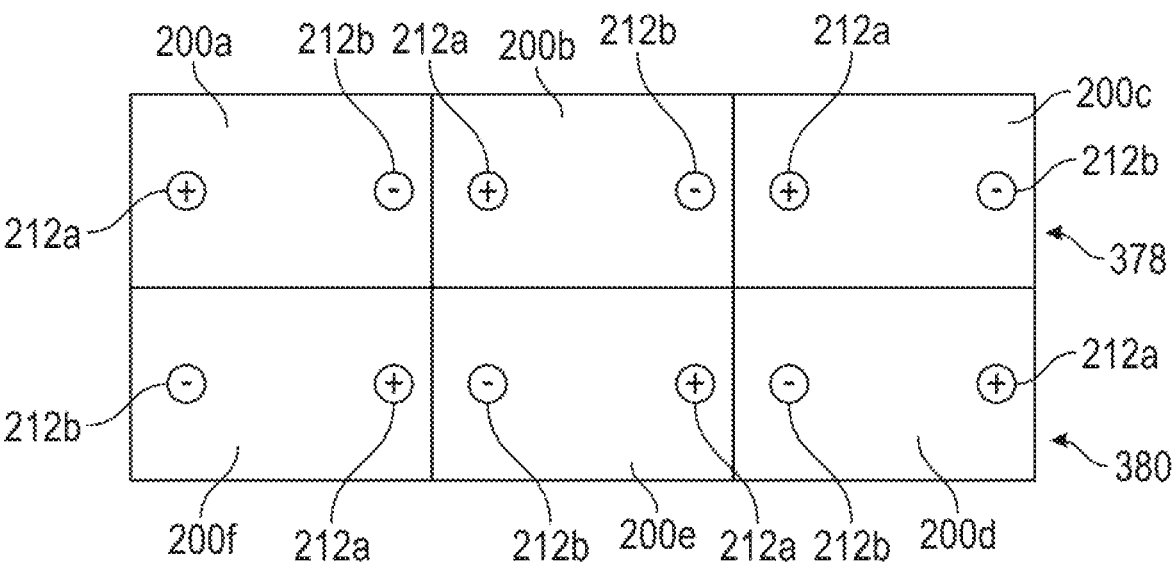
FIG. 18 illustrates a simplified electric circuit formed via a plurality of solar shingles in neighboring first and second rows or PV cells within a solar shingle having a pair of PV strings.

FIG. 18 illustrates a simplified electric circuit formed via a plurality of solar shingles 200a-f. In this illustrated example, electricity, and moreover, the current generated by the PV cells 208 of a first solar shingle 200a, can flow in a first direction from the corresponding first string 276 to a terminal 212a, 212b of a second connector 264 of the first solar shingle 200a. The current may then pass from the terminal 212a, 212b of the second connector 264 of the first solar shingle 200a to a terminal 212a, 212b of a first connector 262 of a second solar shingle 200b, the first and second solar shingles 200a, 200b being in the same, first horizontal row 378 of shingles 200a-c. The current can then pass, in the first direction, along the first string 276 of the second solar shingle 200b and onto a terminal 212a, 212b of the second connector 264 of the second shingle 200b. Currently may then be passed from the second shingle 200b, and flow, again in the first direction, through the first string 276 of the third shingle 200c in a manner similar to that discussed above with respect to first and second shingles 200a, 200b. While the third shingle 200c can be in the same row 378 as the first and second shingles 200a-b, in this example the third shingle 200c can be electrically coupled to a fourth single 200d that is positioned on a second, different horizontal row 380 than the first, second, and third shingles 200a-c. In such an embodiment, a jumper (not shown) can electrically couple a terminal 212a, 212b of the second connector 264 of the third shingle 200c to a corresponding terminal 212a, 212b of the second connector 264 of the fourth shingle 200d. Current may then flow in a second direction, opposite of the first direction, through the first string 276 of the fourth solar shingle 200d and to the first connector 262 of the fourth shingle 200d. Current may similarly flow in the second direction along the first strings 276 of the fifth and sixth solar shingles 200e-f until reaching the first connector 262 of the sixth solar shingle 200f. According to certain embodiments, the current may then flow to an inverter 366 that is coupled to the sixth solar shingle 200f. Alternatively, according to other embodiments, the first connector 262 of the sixth shingle 200f can include a jumper 280 such as that shown in FIGS. 9A and 9B such that current is transferred from one terminal 212b of the connector 262, 264 of the sixth solar shingle 200f to the other terminal 212a of that first connector 262, or vice versa. The electrical current can then flow, in the first direction, along a second line 278, which, again, may or may not be a PV string, of each of the sixth, fifth, and fourth solar shingles 200f, 200g, 200e of the second row 380 before being jumped by a jumper to the third shingle 200c in the first row 378. The current can then flow in the second direction along the seconds lines 278 of the third, second, and first solar shingles 200c, 200b, 200a before being directly or indirectly delivered to the inverter 366. While the foregoing example is discussed in terms of a plurality of solar shingles 200a-f, such an example is also applicable to at least a single solar cell 200, 200' having a first PV string 276 and a second line 278 that may or may not be a PV string.

Figures 19, 20:
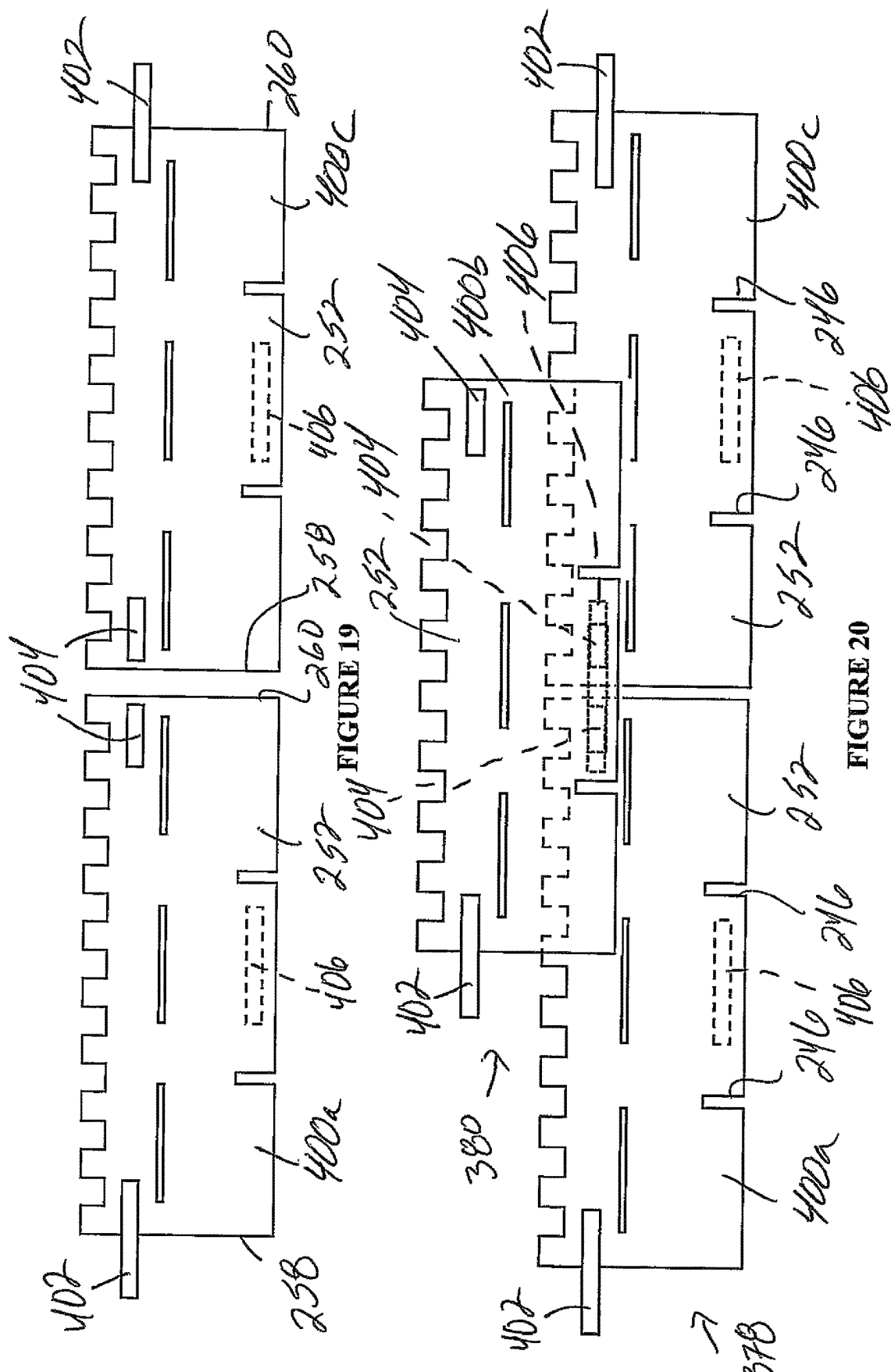
FIG. 19 illustrates a plurality of solar shingles adapted to be electrically coupled in at least vertical direction.
FIG. 20 illustrates the solar shingles shown in FIG. 19 electrically coupled in at least a vertical orientation.

FIGS. 19 and 20 illustrate another embodiment of solar shingles 400a-c having PV cells 208 (not shown) similar to those discussed above. At least some shingles 400a, 400c be installed on a building or structure in the same, first row 378 can be electrically coupled via a connector of another installed shingle 400b that is in a different, second row 380, the first and second rows 378, 380 being at different vertical heights relative to each other. As shown, each shingle 400a-c can include a first polarity jumper 402 and a first polarity terminal 404 at, around, and/or extending from an upper surface 252 of the solar shingle, and a second polarity jumper 406 positioned at or around the bottom wall 256 of the solar shingle 400a-c. Additionally, at least some shingles 400a, 400b can have the first polarity jumper 402 positioned at, and extending away from the first sidewall 258 and the first polarity terminal 404 at, or around, but generally not extending beyond, the second sidewall 260 of the solar shingle 400a, 400b. However, other shingles 400c can have an opposite configuration in which the first polarity jumper 402 is positioned at, and extending away from the second sidewall 260 and the first polarity terminal 404 is at, or around, but generally not extending beyond, the first sidewall 258 of the solar shingle 400c. Further in the embodiment in which the first and third shingles 400a, 400c are installed in the first row 378, the second shingle 400b can be installed at a location in the next, or vertically higher second row 380 such that the second polarity jumper 406, which is accessible from the bottom wall 256 of the second shingle 400b, can come into electrical contact with the first polarity terminal 404 of the first and third shingles 400a, 400c that are positioned on the upper surface 252 of the shingles 400a, 400c. In such a situation, the second polarity jumper 406 can be used to transmit electrical current from the first shingle 400a to the third shingle 400c.

Figures 21, 22:
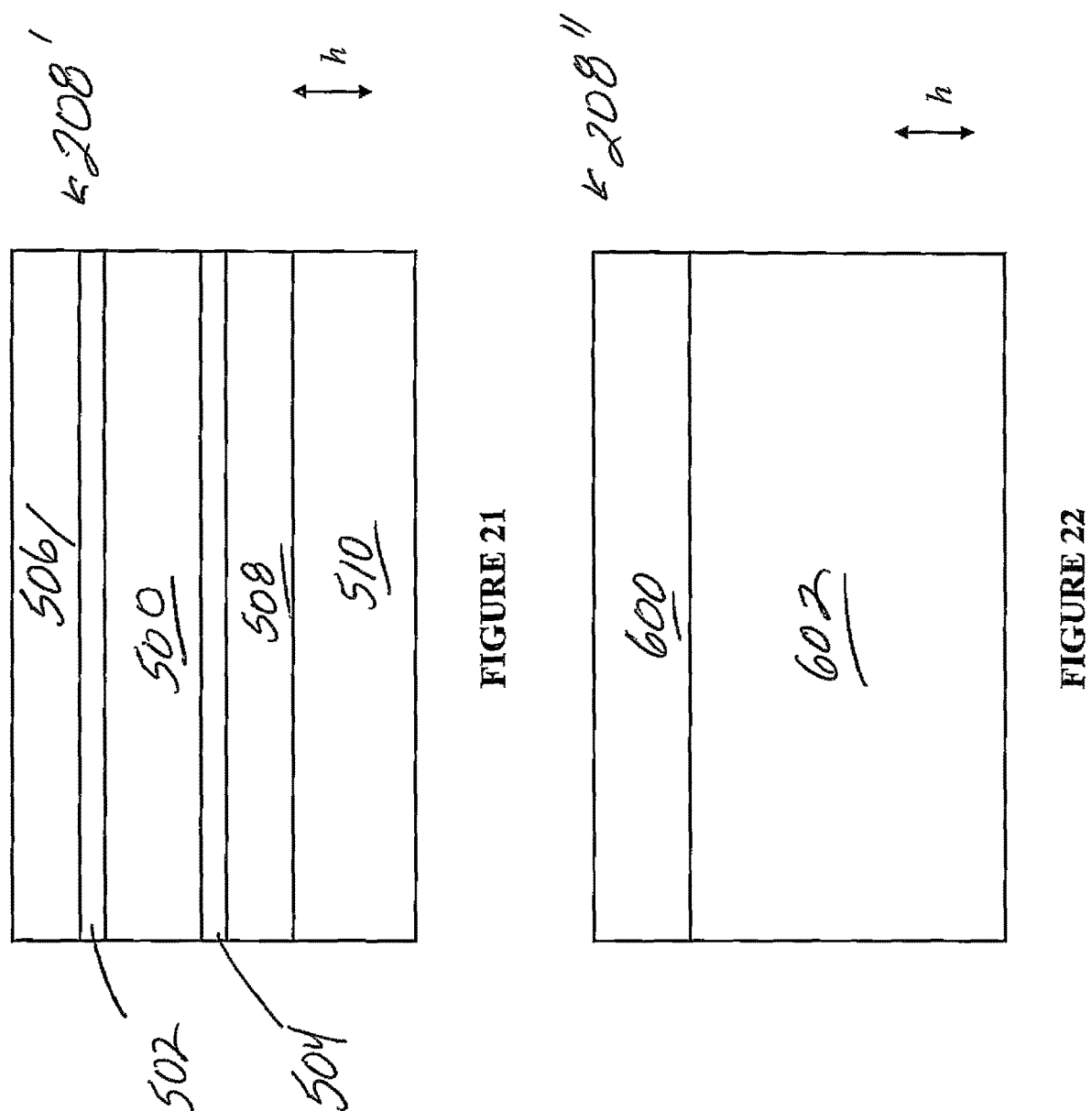
FIG. 21 illustrates a simplified cross sectional view of an exemplary perovskite photovoltaic cell.
FIG. 22 illustrates a simplified cross sectional view of an exemplary silicon photovoltaic cell.

A variety of different types of PV or solar cell technologies, and associated materials, can be utilized for the PV cells 208, including, but not limited to, perovskite, quantum dot, silicon flexible filament, copper indium gallium selenide (CIGS), and cadmium telluride, among others. For example, FIG. 21 illustrates an exemplary perovskite solar cell 208' that, according to certain embodiments, can be utilized for one or more, it not all, of the PV cells 208, including, but not limited to, solar shingles 200, 200' where the first string 276 and the second line 278 each includes at least one perovskite solar cell 208'. As seen, according to such an embodiment, a perovskite layer 500, which may or may not be colored, can be positioned between upper and lower polarity layers 502, 504, Further, as seen, the upper polarity layer 502 can be positioned beneath an adjacent upper electrode 506, which can be transparent. Similarly, the lower electrode 504 can be positioned above an adjacent lower electrode 508, which may, or may not, be part of a substrate 510. The substrate 510 can be configured to provide rigidity to the perovskite solar cell 208', and can be constructed from a variety of materials, including, for example, glass, plastic or rubber, among others. Further, the perovskite solar cell 208' can having an overall height (as generally indicated in the "h" direction in FIG. 21) of around 1 micrometer (μm), and be constructed to generally shield or protect the perovskite layer 500 from exposure to oxygen and moisture.

Additionally, additives and specific layers can be included in the structure of the PV cell 208' to improve reliability and efficiency in the operation of the cell 208'. Further, the methods of manufacture of the PV cell 208' can be adapted to prevent, if not eliminate, gaps in, or between, layers of the PV cell 208', which may otherwise adversely impact the efficiency in the operation of the PV cell 208'. Further, the layers 502, 504, 506, 508, 510 of the perovskite PV cell 208' can be applied to other layers 502, 504, 506, 508, 510 of the cell 208' in a variety of different manners, including, for example, via spray coating or slot-die coating. For example, a hole transport layer and the perovskite layer 500 can be applied to the substrate 510 by spray coating or slot-die coating. Further, the perovskite layer 500 can undergo thermal annealing, including, for example, radiative thermal annealing, which may, according to certain embodiments, utilize an infrared heat lamp and/or oven. Further, according to certain embodiments, the upper polarity layer 502 or electron transport layer can be deposited on top of perovskite layer 500 by thermal evaporation or close-space sublimation. Additionally, according to certain embodiments, the upper electrode 506, which can be a transparent oxide electrode, and can be deposited onto the upper polarity level 502 via pulsed laser deposition, thermal evaporation, or close-space sublimation, among other methods.

Referencing FIG. 22, according to certain embodiments, one or more, if not all, of the PV cells 208 can be a silicon solar cell 208". As seen, according to certain embodiments, the silicon solar cell 208" can have an n-type layer or semiconductor 600 that is positioned above an p-type layer or semiconductor 602, and can have an overall height (as generally indicated in the "h" direction in FIG. 22) of around 180-200 micrometers. The n-type layer 600 can be embedded fingers, including fingers constructed from metal, that can assist in the lateral flow. The p-type layer 602 can have a height that is configured to absorb sufficient light so that the silicon solar cell 208" can output a desired amount of energy.

FIGS. 24-27 illustrate a simplified representation of electrical circuits for a pair of solar shingles 200a, 200b that are operating in either full sun or partial sun/partial shade conditions. As seen, each solar shingle 200a 200b has a first string 276 and a second line 278 that is a PV string in that the first string 276 and the second line 278 in each solar shingle 200a-f includes a first PV cell 208a and a second PV cell 208b. The flow of current in the strings/lines 276, 278 and PV cells 208a, 208b is illustrated by the presence of lines in solid line format, and the general absence of current flow in the circuits is represented in broken line format. Further, for reference, FIG. 23 illustrates and exemplary electrical model of a single PV cell 208.

Figures 23, 24:
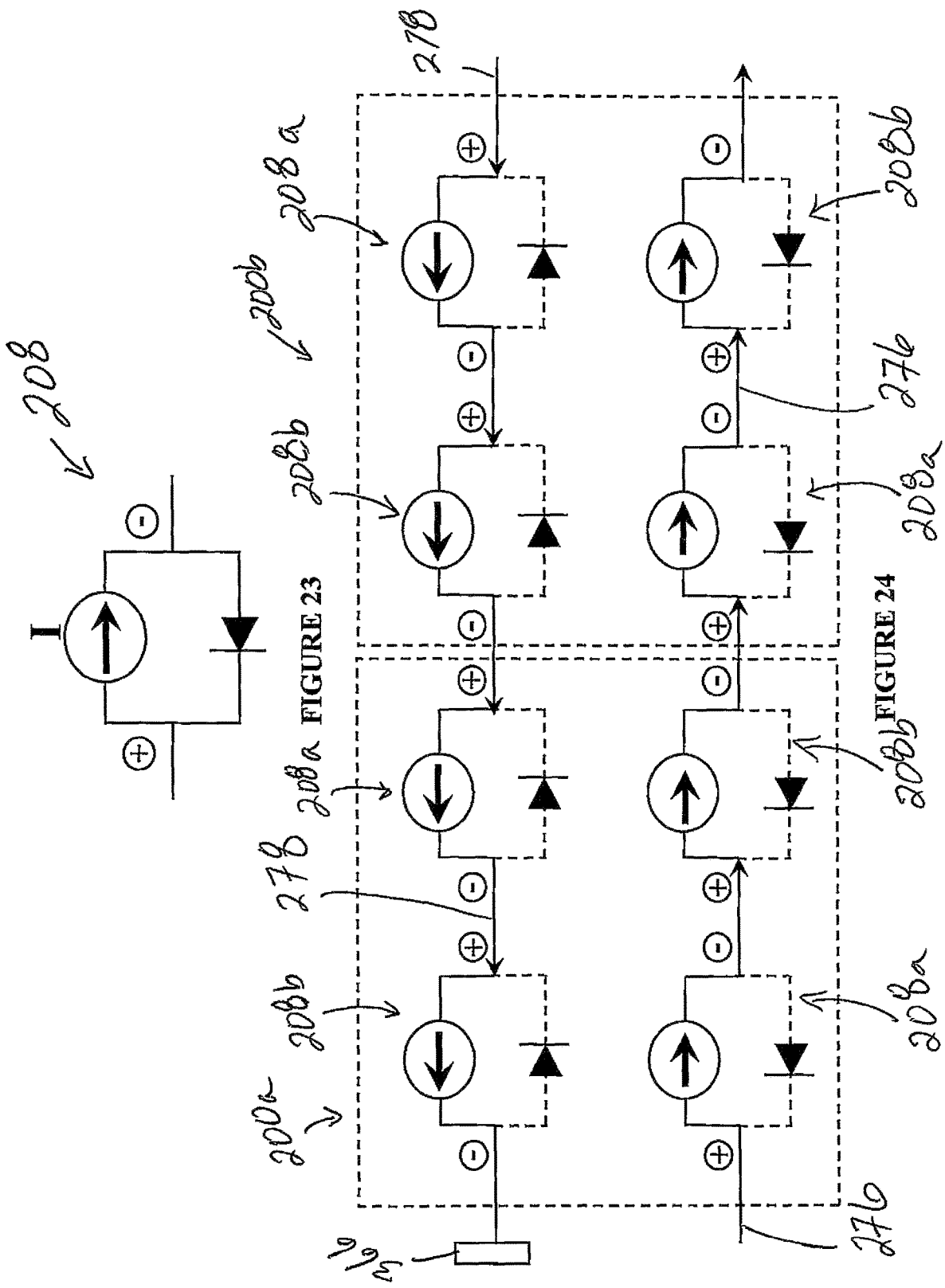
FIG. 23 illustrates a simplified exemplary electric model for a photovoltaic cell.
FIG. 24 illustrates a simplified electrical circuit comprising a pair of solar shingles operating in a full sun condition.

As shown in FIG. 24, during a full sun situation, each of the first and second PV cells 208a, 208b for both the first and second solar shingles 200a, 200b can operate as current sources. Thus, current can flow in a first direction along a first string 276 of the first solar shingle 200a from the first PV cell 208a to the second PV cell 208b. Current can then flow from the first shingle 200a to the second shingle 200b via mating connectors 262, 264, or associated terminals 212a, 212b, as discussed above, and continue flowing in the first direction through the first string 276 and associated first and second PV cells 208a, 208b of the second shingle 200b. Current may then be jumped across terminals 212a, 212b of the same connector 262, 264 of the second shingle 200b such that current is delivered to the second line 278 of the second shingle 200b. Current can then flow through the pair of PV cells 208a, 208b of the second line 278 of the second shingle 200 in a second direction that is opposite of the first direction. Further, the current may flow along the second line 278 from the second shingle 200b to the first solar shingle 200a, and associated PV cells 208a, 208b before eventually being delivered to the micro-inverter 366.

Figure 25:
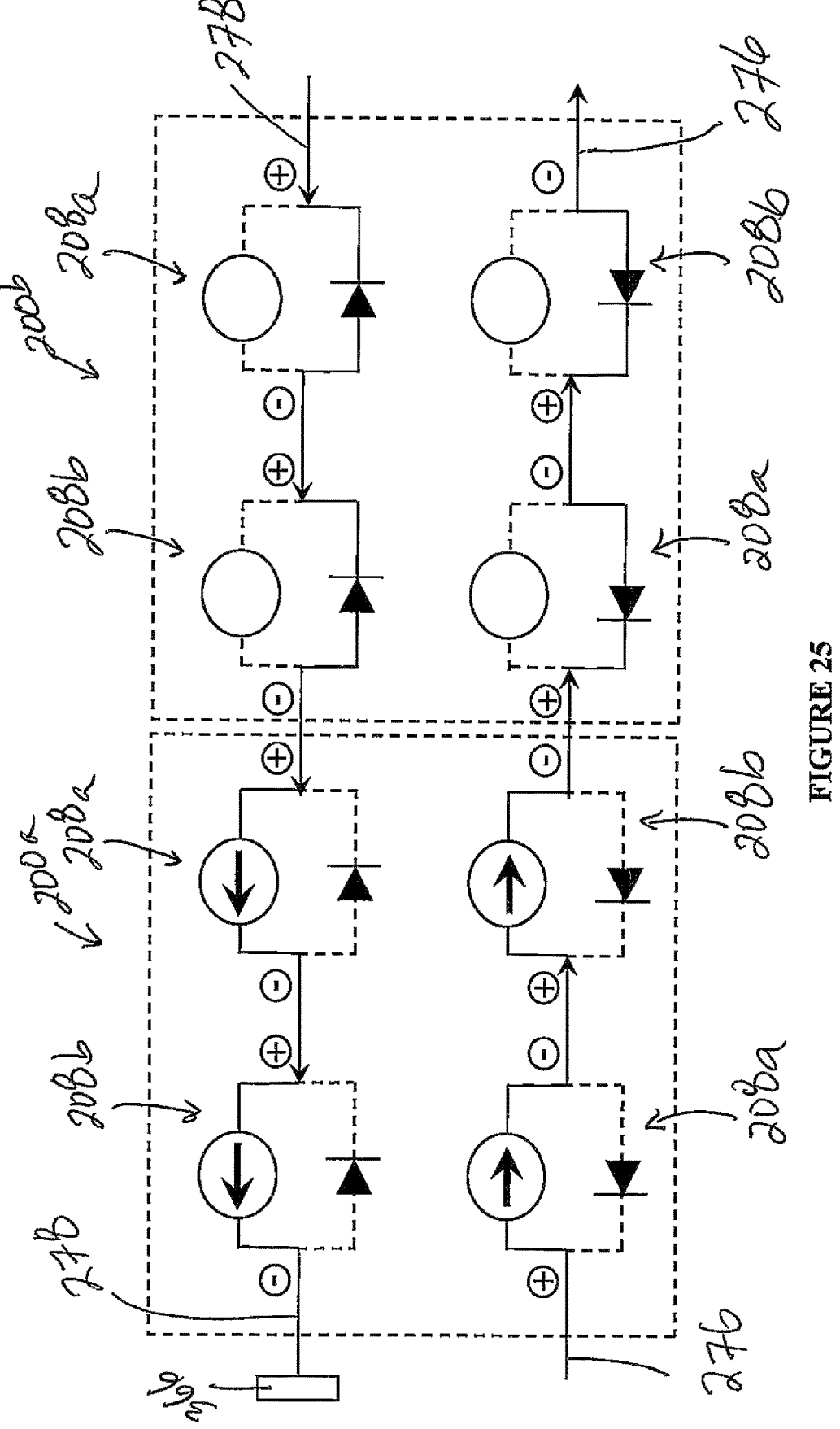
FIG. 25 illustrates the electrical circuit shown in FIG. 24 while operating in a partial shade condition.

FIG. 25 illustrates the configuration shown in FIG. 24, but in at least partial shade or partial sunlight. In particular, FIG. 25 illustrates an embodiment in which the second solar shingle 200b is in shade, while the first solar shingle 200a is in full sun. In such a situation, the PV cells 208a, 208b of each of the first string 276 and second line 278 of the second solar shingle 200b may not be current sources.

Figure 26:
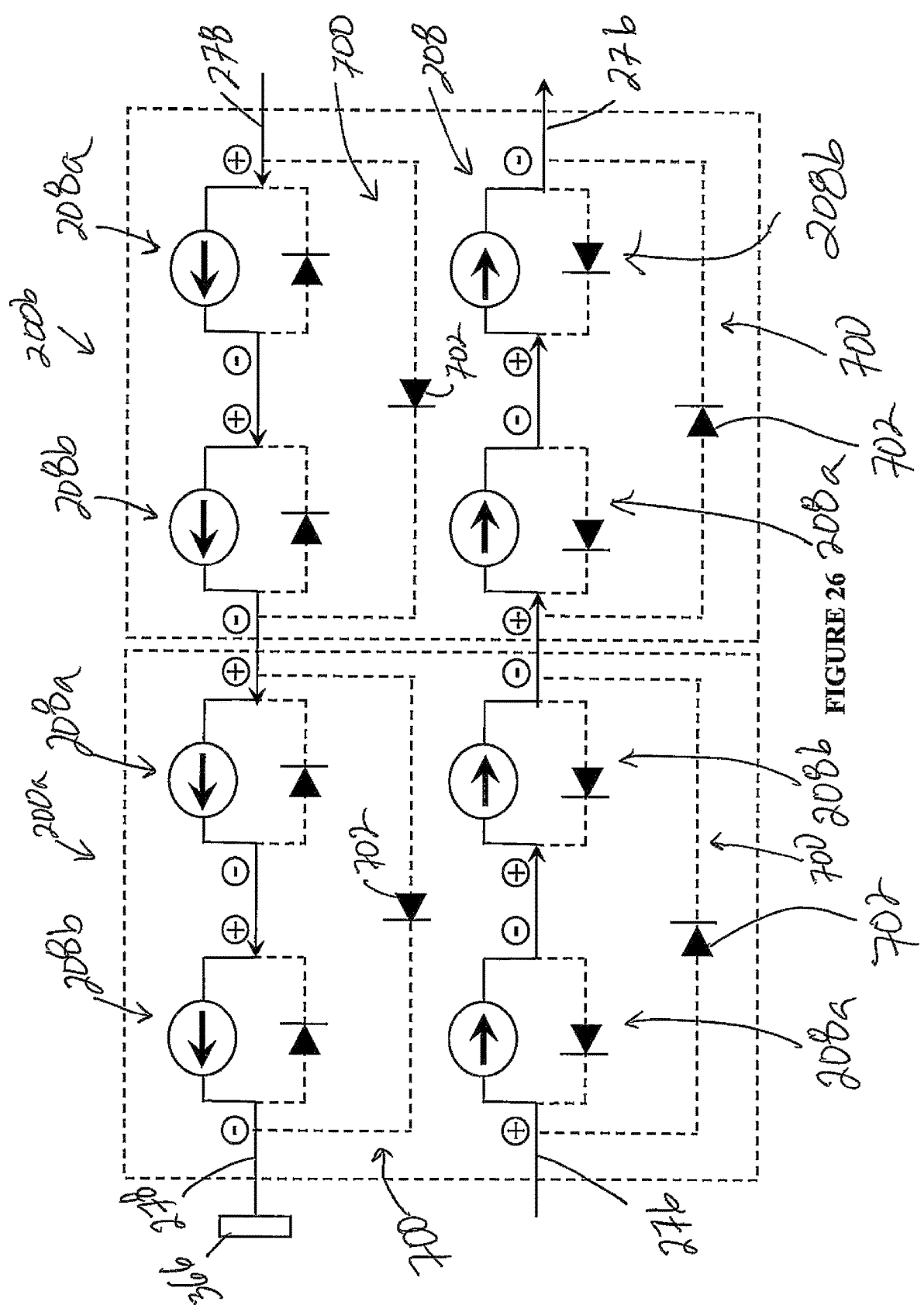
FIG. 26 illustrates a simplified electrical circuit comprising a pair of solar shingles having a bypass circuit and operating in a full sun condition.
Figure 27:
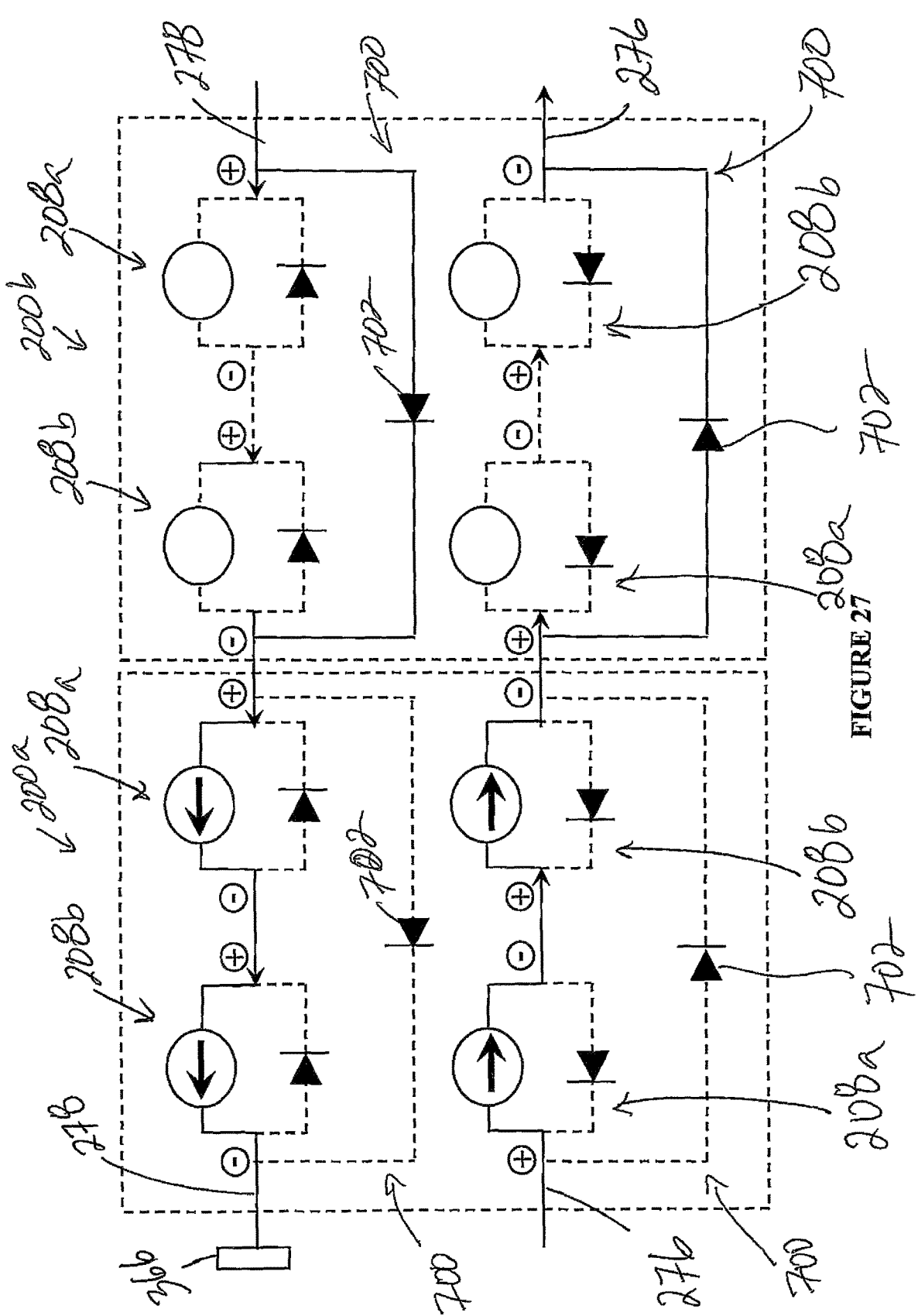
FIG. 27 illustrates the electrical circuit shown in FIG. 26 while operating in a partial shade condition.

FIGS. 26 and 27 illustrate arrangements similar to that shown in FIGS. 24 and 25, but in which the first string 276 and second line 278 of both the first solar shingle 200a and the second solar shingle 200a, 200b each include, or are operably coupled to, a bypass diode circuit 700. As seen, in the illustrated embodiment, for each of the first string 276 and the second line 278 of the first and second solar shingles 200a, 200b, a bypass diode circuit 700 having a diode 702 is connected in parallel across each pair of PV cells 208a, 208b. The bypass diode circuit 700 can be incorporated into the solar shingles 200a, 200b in a variety of manners. For example, according to certain embodiments, the bypass diode circuit 700, or the diode 702, can be integrated into the substrate 206 during a molding or plastic forming process, or with an epoxy or other material. According to such an embodiment, the associated interface or substrate 206 could provide conductivity to the diode 702. Alternatively, the diode 702 can be etched into a thin layer of different material that is imbedded next to PV cells 208a, 208b or a string of PV cells 208a, 208b. For example, according to certain embodiments, the diode 702 can be etched onto the silicone of semiconductor material of a silicon solar cell 208″, including, but not limited to, the n-type layer 600 and/or the p-type layer 602. Thus for example, the diode 702 could be printed onto a semiconductor layer of the silicon solar cell 208″ in a manner that is akin to a printed circuit board (PCB). According to such an embodiment, rather than utilizing wires for the bypass diode circuit 700, bus bars could be provided to be electrically coupled to the diode 702.

During full sun conditions, the PV cells 208a, 208b of each of the first and second solar shingles 200a, 200b can produce electrical energy. Thus, in such a situation, the solar shingles 200a, 200b can operate in a manner similar to that shown in, and discussed above with respect to, FIG. 24. Moreover, in such a situation, current may not flow through the bypass diode circuits 700 in either the first or second shingles 200a, 200b. However, during at least partially shaded conditions, as depicted for example in FIG. 27, in the absence of electrical energy being produced by the PV cells 208a, 208b of the second solar shingle 200, current flow in the second solar shingle 200b can be diverted to the through the bypass diode circuits 700. In such a situation, wherein conditions still accommodate electrical energy being generated by the PV cells 208a, 208b of the first shingle 200a, and not the second shingle 200b, diverting the flow of current to the bypass diode circuits 700 of the second solar shingle 200b, and not to the PV cells 208a, 208b of both the first string 276 and second line 278 of the second shingle 200b can prevent losses that may otherwise be attributed to the PV cells 208a, 208b of the second solar shingles 200a, 200b not producing electrical energy.

Figure 28:
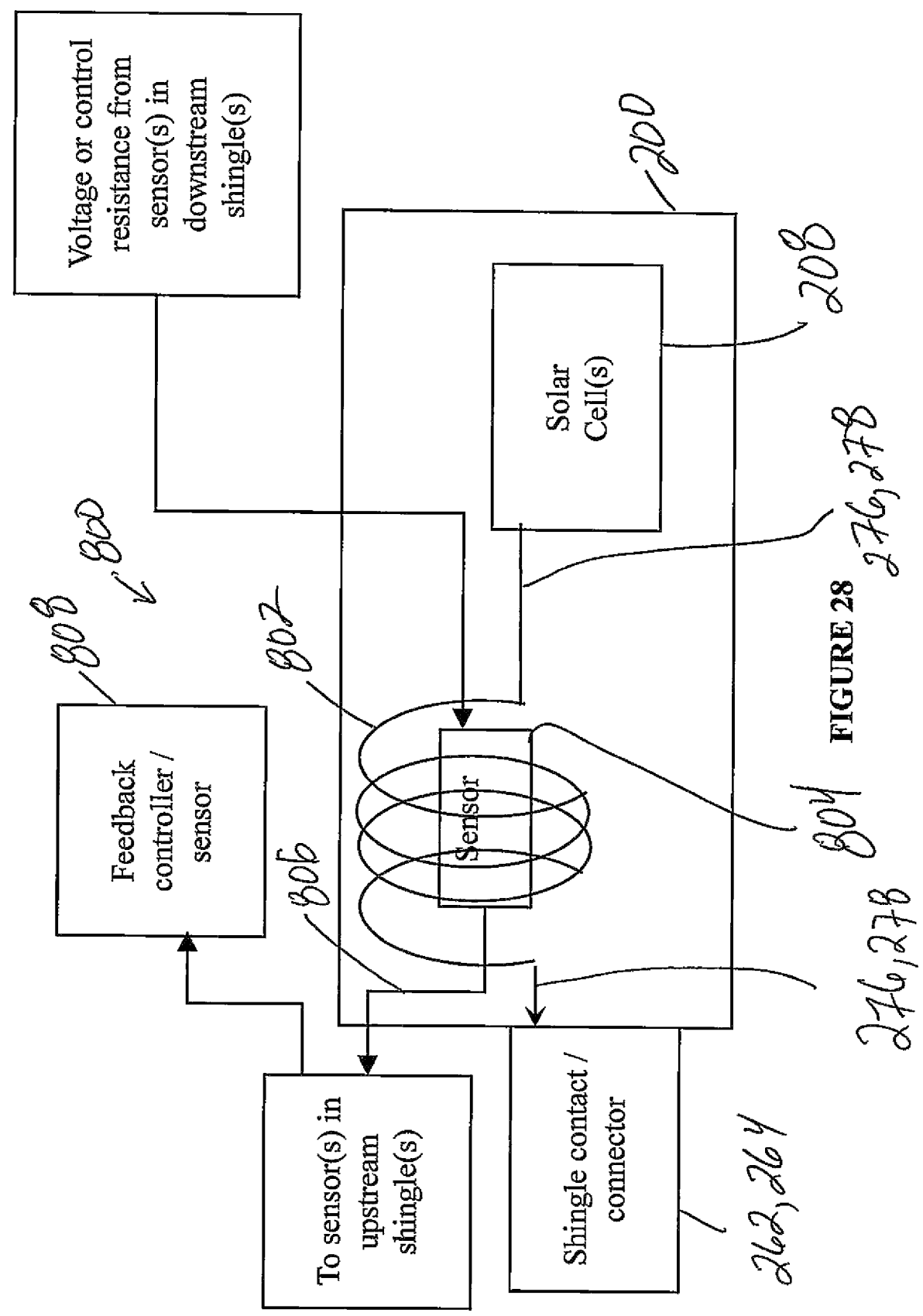
FIG. 28 illustrates a simplified block diagram of a first embodiment of a feedback system utilized in connection with a plurality of electrically coupled solar shingles.
Figure 29:
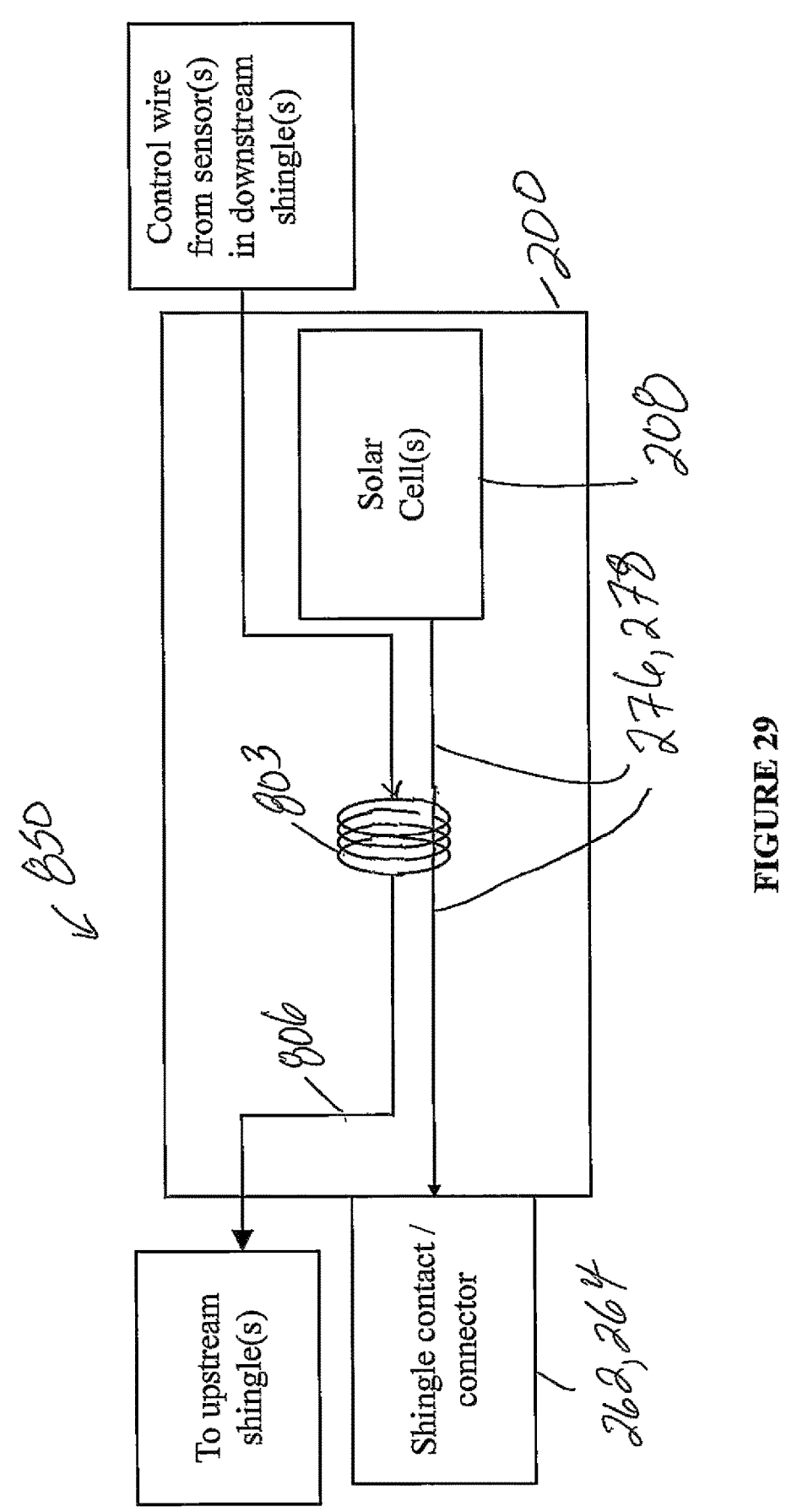
FIG. 29 illustrates a simplified block diagram of a second embodiment of a feedback system utilized in connection with a plurality of electrically coupled solar shingles.

FIGS. 28 and 29 illustrate simplified block diagrams of first and second embodiments of feedback systems 800, 850 utilized in connection with a plurality of electrically coupled solar shingles 200, 200′, including for example solar shingles 200, 200′ installed on a roof of a building or structure. With respect to the embodiment shown in FIG. 28, the feedback system 800 can include a coil 802 and a sensor 804 positioned within, or around, the coil 802. The coil 802 can be positioned along, or extend from, one of the first string 276 and the second line 278. As current flows through the coil 802, a relatively small magnetic field can be generated at or around the coil 802 that can be sensed by the sensor 804, which may, for example, be a magnetic sensing microchip. The sensor 804 can output a relatively small control resistance or voltage. According to such an embodiment, the connectors 262, 264 of the solar shingles 200, 200′ may also include a control terminal for a control wire 806 in each shingle 200 through which the control resistance or voltage from the sensor(s) 804, as well from sensors 804 from other solar panels 200, 200′, can be communicated from shingle 200 to shingle 200, and eventually to a feedback controller 808.

The output from the sensor 804 of the shingle 200, 200′ can be communicated so as to be added to the output of the sensor(s) 804 of each of one or more other downstream and/or upstream shingles 200, 200′. For example, as illustrated in FIG. 28, according to certain embodiments, the sensor 804 of a shingle 200, 200′ can receive the accumulated output provided by the sensors 804 of other, downstream solar shingles 200, 200′. The output of that sensor 804 can then be added to the accumulated output of the sensors 804 of the other solar shingles 200, 200′, and be communicated to a sensor 804 of another, upstream shingle 200, 200′. The process can continue for a collection of solar shingles 200, 200′ that are electrically coupled together until the feedback controller 808 receives the summated output, or an output that can be summated from, the sensors 804 of the electrically coupled solar shingles 200, 200′.

The feedback controller 808 can be adapted to identify from the summated output if, and which of, any of the solar shingles 200, 200′ that may not be operating properly, or possible has a connection issue. For example, according to an embodiment in which 17 solar shingles 200, 200′ are coupled together, the feedback controller 808 can be configured to be recognize a summated output, or range of summated output, that the feedback controller 808 is expected to receive if all 17 solar shingles 200, 200′ are operating properly and/or are not having transmission or connection issues. Such an anticipated summated output can also take into consideration anticipated resistive losses that may be associated with the transmission of at least the outputs of the sensors 804 between the solar shingles 200, 200′ and/or from the solar shingles 200, 200′ to the feedback controller 808. In the event the summated output received and/or evaluated by the feedback controller 808 is less than the anticipated summated output, the extent of the deviation between the anticipated summated output and the evaluated summated output can provide an indication of which solar shingle 200, 200′ may not be operating and/or connected properly. For example, in the above example, the evaluated summated output being about 4/17ths less than the anticipated summated output can indicate an issue with the 4th shingle from the last shingle 200, 200' (e.g. the 13 shingle in a row of 17 shingles). Similarly, an the evaluated summated output that is about half of the anticipated summated output and indicate an issue with a middle shingle 200, 200', such as, for example, the 8th and/or 9th shingle in the row of 17 shingles 200, 200'.

With respect to the feedback system 850 shown in FIG. 29, rather than using a sensor 804 or coiling the first string 276 or second line 278, the control wire 804 in the solar shingle 200, 200' can be configured to provide, or otherwise be coupled to, a coil 803 that can extend around at least a portion of the first string 276 or second line 278. According to such an embodiment, power passing through the associated first string 276 or second line 278 can produce a magnetic field in the coil 803, and thus the control wire 806, that may be detected by the feedback controller 808. Such a configuration can, similar to the feedback system 800 of FIG. 28, result in obtaining a summated output that can be evaluated with respect to an anticipated summated output.

Figure 30:
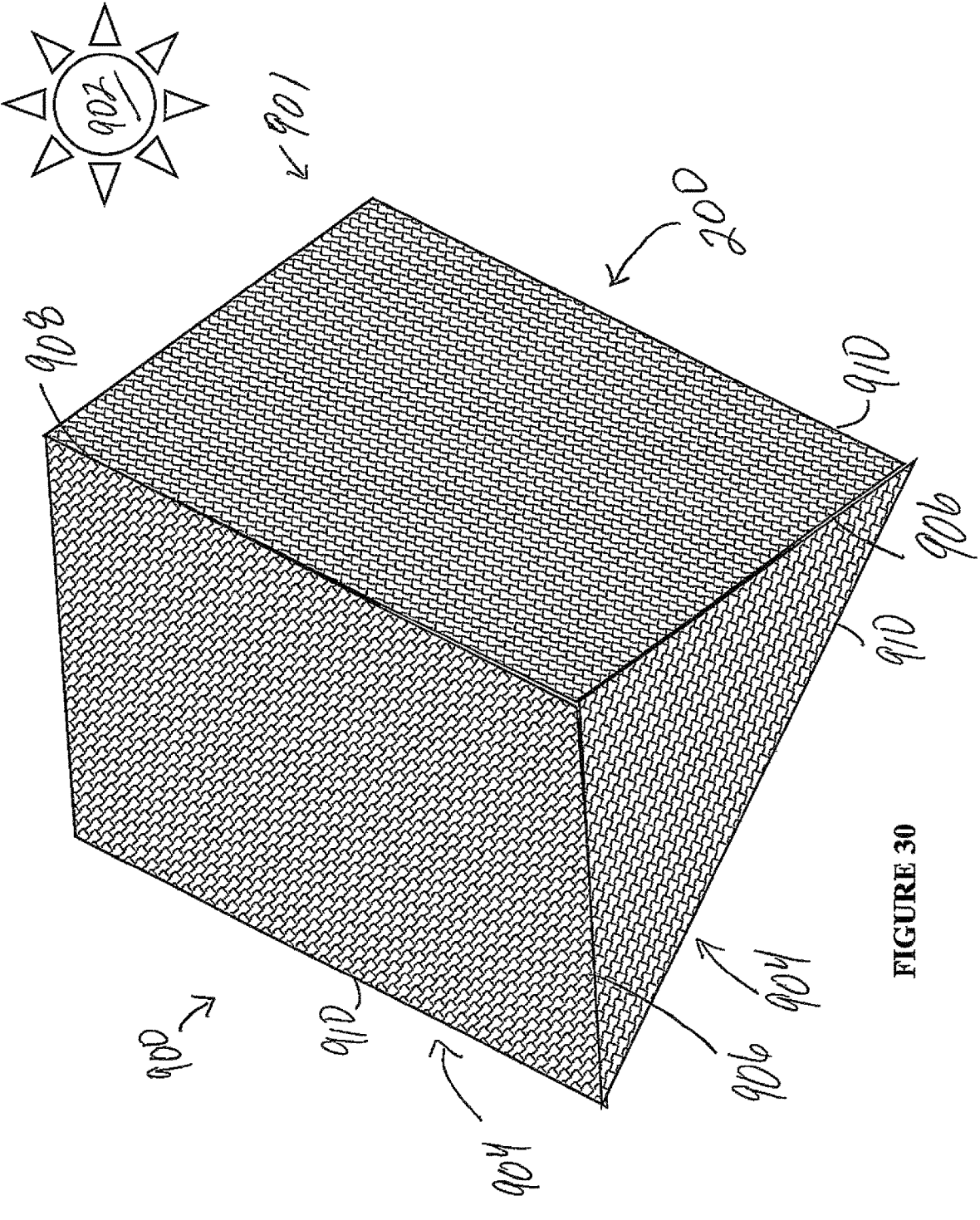
FIG. 30 illustrates an example of a collection of active solar shingles and inactive shingles having similar appearances positioned on different portions of a roof.

FIG. 30 illustrates an example of a roof system 901 comprising a collection of active solar shingles 200 along a portion of a roof 990 that having appearances and/or aesthetics similar to a collection of inactive shingles 904 that are located at other portions of the same roof 900. As previously discussed, the active solar shingles 200 can be placed at positions at which exposure to the sun 902 is anticipated to be at levels that may be deemed appropriate for producing electrical power via PV cells 208, while traditional, inactive shingles 904 can be positioned along other portions of the roof 900 that is/are anticipated to have less sun exposure. Further, while the solar shingles 200 disclosed herein are shown in the figures as having a generally rectangular shape, the solar shingles 200 can have a variety of other shapes and configurations. For example, the solar shingles 200 can a variety of other shapes for particular installations and/or installations in different areas of a roof 900 or structure, including, for example, at or along hips 906, ridges 908, valleys, eaves 910, skylights, vent pipes, and flashing 364.

While embodiments disclosed herein illustrate at least solar shingles 200a-f arranged at least in rows in left to right and/or right to left arrangements, the solar shingles 200a-f can be arranged in a variety of other orientations, patterns, and configurations. Additionally, embodiments of the subject disclosure can accommodate roof designs in which connections relating of the associated the power management system, including the inventers 366, converters, and batteries, among other components, can be selectively located on one or both sides of a roof 900 or associated building or structure. Such a design also allows the roof system 901, including a plurality of active solar shingles 200, 200', and, optionally, inactive shingles 904, to be built in configurable, sized zones based on the specific application, including specific roof or building design and/or anticipated levels of sunlight exposure.

Thus, the present invention provides a product that is capable to use existing market-ready solar technology like silicon, and use next-generation technologies which have not been commercially scaled yet, and iterate on asphalt shingles the roofing industry has already perfected and grown to love. The new technologies can be efficient to manufacture so as to be synthesized in a solar powered lab and sprayed onto surfaces without massive electrode arc furnaces and heavy machinery. Since solar roof tile manufacturer engineers and roofing/solar installers are very expensive, the complexity of current solutions does not prioritize the installer and maintenance. The disclosures, as described herein, can provide a roof system 901 that is relatively simple to install, particularly when compared to traditional shingles, and can be cut to shape and sealed again from weather in real-time during an install.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A solar shingle comprising:
a substrate positioned beneath an upper material layer of the solar shingle;
a first photovoltaic string having at least one photovoltaic cell disposed in the substrate;
a second photovoltaic string having at least one photovoltaic cell disposed in the substrate and disposed in parallel to the first photovoltaic string;
a first connector disposed in the substrate and having a first terminal and a second terminal, the first terminal of the first connector being electrically coupled to the first photovoltaic string, the second terminal of the first connector being electrically coupled to the second photovoltaic string;
a second connector disposed in the substrate and having a first terminal and a second terminal, the first terminal of the second connector being electrically coupled to the second photovoltaic string, the second terminal of the second connector being electrically coupled to the first photovoltaic string; and
a nail strip extending about at least a portion of the upper material layer, the nail strip not extending over both the first photovoltaic string and the second photovoltaic string.

2. The solar shingle of claim 1, further comprising a patch assembly removably secured to the first terminal, the patch assembly comprising a jumper and an outer protective layer, the jumper being electrically coupled to the first and second terminals of the first connector, the outer protective layer comprising an electrically non-conductive material.

3. The solar shingle of claim 2, wherein the first connector includes a first inner adhesive bead and a second outer adhesive bead, the first inner adhesive bead being coupled to the jumper, and the second outer adhesive bead being adhered to the outer protective layer.

4. The solar shingle of claim 1, further including one or more vents, the one or more vents including an opening and a passageway, the passageway being in fluid communication with the opening, the opening extending through a portion of a bottom sidewall of the solar shingle.

5. The solar shingle of claim 1, wherein an upper surface of the upper material layer has one or more recesses positioned between a first sidewall and a second sidewall of the solar shingle and adjacent to the at least one photovoltaic cell.

6. The solar shingle of claim 5, the one or more recesses define an upper side boundary of a photovoltaic cell zone, an opposing lower side boundary of the photovoltaic cell zone extending to a bottom sidewall of the solar shingle, the photovoltaic cell zone further vertically extending below the upper material layer, wherein the at least one photovoltaic cell is confined to being positioned within the photovoltaic cell zone, and further wherein the nail strip is not positioned in the photovoltaic cell zone.

7. The solar shingle of claim 1, wherein the first photovoltaic string further includes at least one bypass diode circuit adapted to provide a pathway for electrical current to bypass the at least one photovoltaic cell.

8. A roofing system comprising:
a plurality of solar shingles, each including:
  a substrate positioned beneath an upper material layer of the solar shingle;
  a first photovoltaic string having at least one photovoltaic cell;
  a first connector having a first terminal and a second terminal, the first terminal of the first connector being electrically coupled to the first photovoltaic string, the second terminal of the first connector being electrically coupled to a second line;
  a second connector having a first terminal and a second terminal, the first terminal of the second connector being electrically coupled to the second line, the second terminal of the second connector being electrically coupled to the first photovoltaic string; and
  a nail strip extending about at least a portion of the upper material layer, the nail strip not extending over both the first photovoltaic string and the second line; and a plurality of inactive shingles, each inactive shingle of the plurality of inactive shingles not including a PV cell,
wherein an upper surface of each solar shingle of the plurality of solar shingles has a texturized surface that has an uneven surface profile, the texturized surface having an appearance similar to a texturized surface of the plurality of inactive shingles.

9. The roofing system of claim 8, further including at least one inactive solar shingle, the inactive solar shingle not having a photovoltaic cell, and wherein the at least one inactive solar shingle includes at least one connector and at least one line, at least a portion of the at least one line being electrically coupled to a terminal of the at least one connector and configured for selective separation from at least a portion of a bottom wall of the inactive solar shingle, and wherein at least a portion of the inactive solar shingle has an appearance similar to the texturized surface of the plurality of inactive shingles.

10. A solar shingle comprising:
a substrate positioned beneath an upper material layer of the solar shingle;
a first photovoltaic string having at least one photovoltaic cell;
a first connector having a first terminal and a second terminal, the first terminal of the first connector being electrically coupled to the first photovoltaic string, the second terminal of the first connector being electrically coupled to a second line;
a second connector having a first terminal and a second terminal, the first terminal of the second connector being electrically coupled to the second line, the second terminal of the second connector being electrically coupled to the first photovoltaic string;
a nail strip extending about at least a portion of the upper material layer, the nail strip not extending over both the first photovoltaic string and the second line; and
a patch assembly removably secured to the first terminal, the patch assembly comprising a jumper and an outer protective layer, the jumper being electrically coupled to the first and second terminals of the first connector, the outer protective layer comprising an electrically non-conductive material.

* * * * *